United States Patent
Claessens et al.

(10) Patent No.: US 11,341,396 B2
(45) Date of Patent: May 24, 2022

(54) METHODS, CONTROLLERS AND SYSTEMS FOR THE CONTROL OF DISTRIBUTION SYSTEMS USING A NEURAL NETWORK ARCHITECTURE

(71) Applicant: VITO NV, Mol (BE)

(72) Inventors: Bert Claessens, Mol (BE); Peter Vrancx, Brussels (BE)

(73) Assignee: VITO NV, Mol (BE)

( * ) Notice: Subject to any disclaimer, the term of this patent is extended or adjusted under 35 U.S.C. 154(b) by 971 days.

(21) Appl. No.: 16/066,118

(22) PCT Filed: Dec. 26, 2016

(86) PCT No.: PCT/EP2016/082676
§ 371 (c)(1),
(2) Date: Jun. 26, 2018

(87) PCT Pub. No.: WO2017/114810
PCT Pub. Date: Jul. 6, 2017

(65) Prior Publication Data
US 2019/0019080 A1    Jan. 17, 2019

(30) Foreign Application Priority Data
Dec. 31, 2015   (EP) .................... 15203252

(51) Int. Cl.
*G06N 3/08* (2006.01)
*G06Q 50/06* (2012.01)
(Continued)

(52) U.S. Cl.
CPC ......... *G06N 3/0472* (2013.01); *G05B 13/027* (2013.01); *G06N 3/0454* (2013.01); *G06N 3/08* (2013.01); *G06Q 50/06* (2013.01)

(58) Field of Classification Search
CPC .... G05B 13/027; G06Q 50/06; G06N 3/0454; G06N 3/08
See application file for complete search history.

(56) References Cited

U.S. PATENT DOCUMENTS

2009/0228324 A1   9/2009  Ambrosio et al.
2014/0032007 A1   1/2014  Claessens et al.

FOREIGN PATENT DOCUMENTS

CN   101201591 A   6/2008
CN   101566829 A   10/2009
(Continued)

OTHER PUBLICATIONS

Wang, Zhiguang & Oates, Tim. (2015). Encoding Time Series as Images for Visual Inspection and Classification Using Tiled Convolutional Neural Networks. (Year: 2015).*
(Continued)

*Primary Examiner* — Kakali Chaki
*Assistant Examiner* — Johnathan R Germick
(74) *Attorney, Agent, or Firm* — Bacon & Thomas, PLLC

(57) ABSTRACT

A deep approximation neural network architecture which extrapolates data over unseen states for demand response applications in order to control distribution systems like product distribution systems of which energy distribution systems, e.g. heat or electrical power distribution, are one example. The method is a model-free control technique mainly in the form of Reinforcement Learning (RL) where a controller learns from interaction with the system to be controlled to control product distributions of which energy distribution systems, e.g. heat or electrical power distribution, are one example.

20 Claims, 15 Drawing Sheets

(51) Int. Cl.
G06N 3/04 (2006.01)
G05B 13/02 (2006.01)

(56) References Cited

FOREIGN PATENT DOCUMENTS

| CN | 101859102 A | 10/2010 |
|---|---|---|
| CN | 102934131 A | 2/2013 |
| CN | 104412247 A | 3/2015 |
| EP | 2618445 A1 | 7/2013 |
| EP | 2806520 A1 | 11/2014 |
| EP | 2608123 B1 | 11/2016 |
| JP | 2011022902 A | 2/2011 |
| JP | 2014512052 A | 5/2014 |
| WO | 2012164102 A2 | 6/2012 |

OTHER PUBLICATIONS

Vazquez, C. & Krishnan, R. & John, E . . . (2015). Time series forecasting of cloud data center workloads for dynamic resource provisioning. 6. 87-110. (Year: 2015).*
Xue-song Wang, Yu-hu Cheng, & Wei Sun (2007). A Proposal of Adaptive PID Controller Based on Reinforcement Learning. Journal of China University of Mining and Technology, 17(1), 40-44. (Year: 2007).*
H. Soltau, G. Saon and T. N. Sainath, "Joint training of convolutional and non-convolutional neural networks," 2014 IEEE International Conference on Acoustics, Speech and Signal Processing (ICASSP), 2014, pp. 5572-5576, doi: 10.1109/ICASSP.2014.6854669. (Year: 2014).*
Zhao, D., Wang, B. & Liu, D. A supervised Actor-Critic approach for adaptive cruise control. Soft Comput 17, 2089-2099 (2013). https://doi.org/10.1007/s00500-013-1110-y (Year: 2013).*
F. Farahnakian, P. Liljeberg and J. Plosila, "Energy-Efficient Virtual Machines Consolidation in Cloud Data Centers Using Reinforcement Learning," 2014 22nd Euromicro International Conference on Parallel, Distributed, and Network-Based Processing, 2014, pp. 500-507, doi: 10.1109/PDP.2014.109. (Year: 2014).*
Mnih, V., Kavukcuoglu, K., Silver, D. et al. Human-level control through deep reinforcement learning. Nature 518, 529-533 (2015). https://doi.org/10.1038/nature14236 (Year: 2015).*
L. Ma, J. W. Minett, T. Blu and W. S.-Y. Wang, "Resting State EEG-based biometrics for individual identification using convolutional neural networks," 2015 37th Annual International Conference of the IEEE Engineering in Medicine and Biology Society (EMBC), 2015, pp. 2848-2851, (Year: 2015).*
Fabien Lotte, Laurent Bougrain, Maureen Clerc. Electroencephalography (EEG)-based BrainComputer Interfaces. Wiley Encyclopedia of Electrical and Electronics Engineering, Wiley, pp. 44, 2015, ff10.1002/047134608X.W8278ff. ffhal-01167515f(Year: 2015).*
Japanese Office Action in corresponding Japanese Application No. 2018-534532, dated Jan. 19, 2021.
International Search Report for PCT/EP2016/082676 dated Apr. 19, 2017.
Written Opinion for PCT/EP2016/082676 dated Apr. 19, 2017.

Ruelens et al., "Residential Demand Response Applications Using Batch Reinforcement Learning," Corr (ARXIV), vol. abs/1504.02125, Apr. 8, 2015, pp. 1-9.
Mnih et al., "Human-level control through deep reinforcement learning," Nature, vol. 518, No. 7540, Feb. 25, 2018, pp. 529-533.
Hausknecht et al., "Deep Recurrent Q-Learning for Partially Observable MDPs," Corr (ARXIV), No. 1507.06527v3, Aug. 27, 2015, pp. 1-9.
Ruelens et al., "Demand response of a heterogeneous cluster of electric water heaters using batch reinforcement learning," 2014 Power Systems Computation Conference, Aug. 18, 2014, pp. 1-7.
Du et al., "Learning Spatiotemporal Features with 3D Convolutional Networks," 2015 IEEE International Conference on Computer Vision, IEEE, Dec. 7, 2015, pp. 4489-4497.
European Search Report for corresponding app. EP 15203252.0-1951 dated Jul. 7, 2016.
J. Cigler, D. Gyalistras, J. Siroky, V. Tiet, L. Ferkl, "Beyond theory: the challenge of implementing model predictive control in buildings" in: Proceedings of 11th Rehva World Congress, Clima, 2013.
S. Koch, J. L. Mathieu, and D. S. Callaway, "Modeling and control of aggregated heterogeneous thermostatically controlled loads for ancillary services," in Proc. 17th IEEE Power Sys. Comput. Conf. (PSCC), Stockholm, Sweden, Aug. 2011, pp. 1-7.
D. Ernst, P. Geurts, and L. Wehenkel, "Tree-based batch mode reinforcement learning," Journal of Machine Learning Research, pp. 503-556, 2005.
M. Riedmiller, "Neural fitted Q-iteration-first experiences with a data efficient neural reinforcement learning method," in Proc. 16th European Conference on Machine Learning (ECML), vol. 3720 Porto, Portugal: Springer, Oct. 2005, p. 317.
"Experimental analysis of data-driven control for a building heating system", Giuseppe Tommaso Costanzo, Sandro Iacovella, Frederik Ruelens, T. Leurs, Bert Claessens, Feb. 16, 2016.
Daniel O'Neill et al., "Residential Demand Response Using Reinforcement Learning," in Smart Grid Communications (SmartGridComm), 2010 First IEEE International Conference, pp. 409-414, Oct. 4-6, 2010.
Emre Can Kara et al., "Using Smart Devices for System-Level Management and Control in the Smart Grid: A Reinforcement Learning Framework," in Smart Grid Communications (SmartGridComm), 2012 IEEE Third Internationa Conference, pp. 85-90, Nov. 5-8, 2012.
Wei Zhang et al., "Aggregate Model for Heterogeneous Thermostatically Controlled Loads with Demand Response," in Power and Energy Society General Meeting, 2012 IEEE , pp. 1-8, Jul. 22-26, 2012.
Dimitri P. Bertsekas, Convex Optimization Algorithms, Massachusetts Institute of Technology, 12 pages, 2015.
Frederik Ruelens et al., "Residential Demand Response of Thermostatically Controlled Loads Using Batch Reinforcement Learning", CORR (ARXIV) vol. abs 1504.02125, pp. 2149-2159, Apr. 8, 2015, published in IEEE Transactions on smart Grid, vol. 8, No. 5, Sep. 2017.
Sandro Iacovella et al., "Cluster Control of Heterogeneous Thermostatically Controlled Loads Using Tracer Devices," IEEE Transactions on Smart Grid, vol. 8, No. 2, Mar. 2017, pp. 528-536.
Chinese Office Action in corresponding Chinese Application No. 201680077577.X, dated Oct. 9, 2021.

* cited by examiner

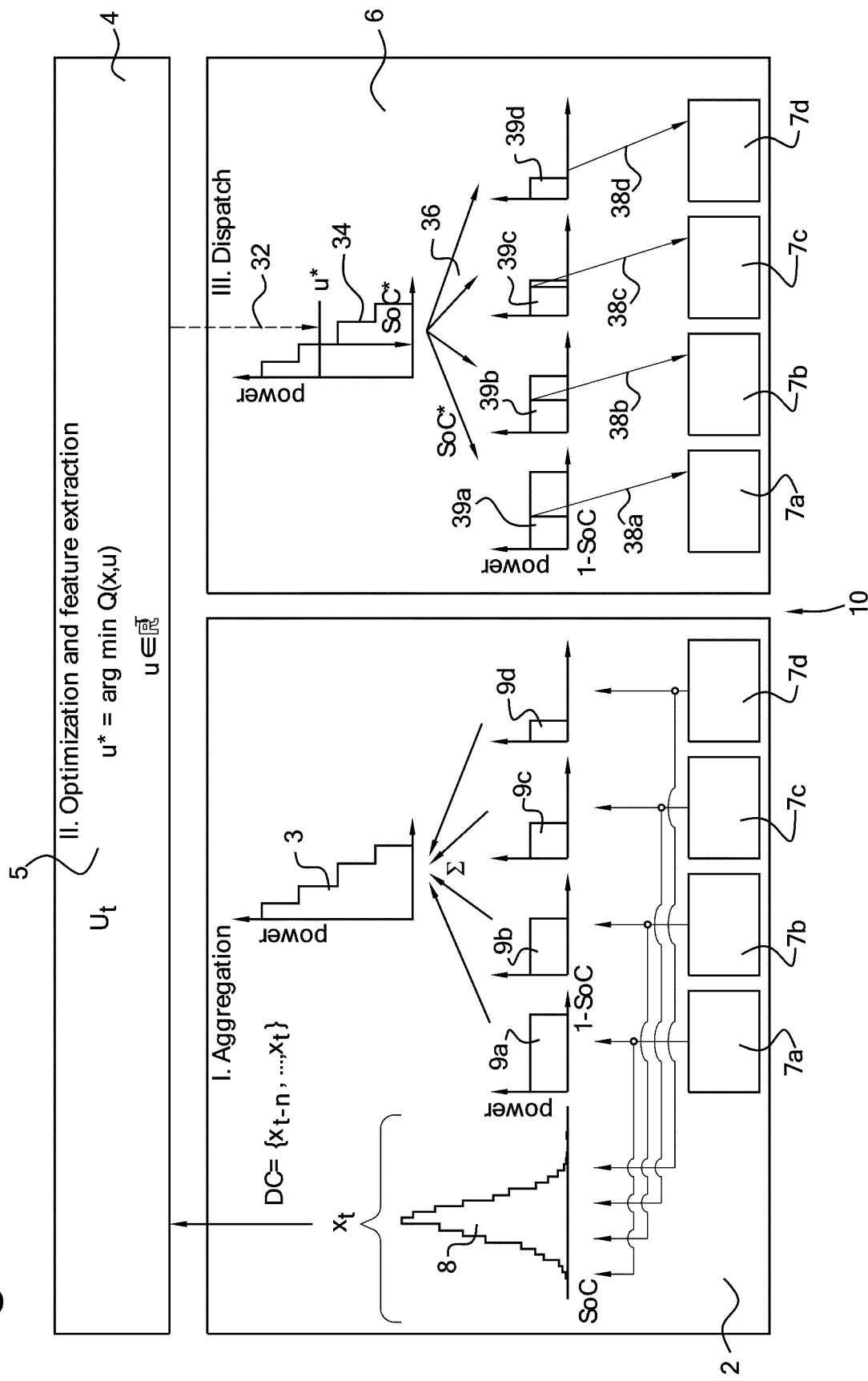

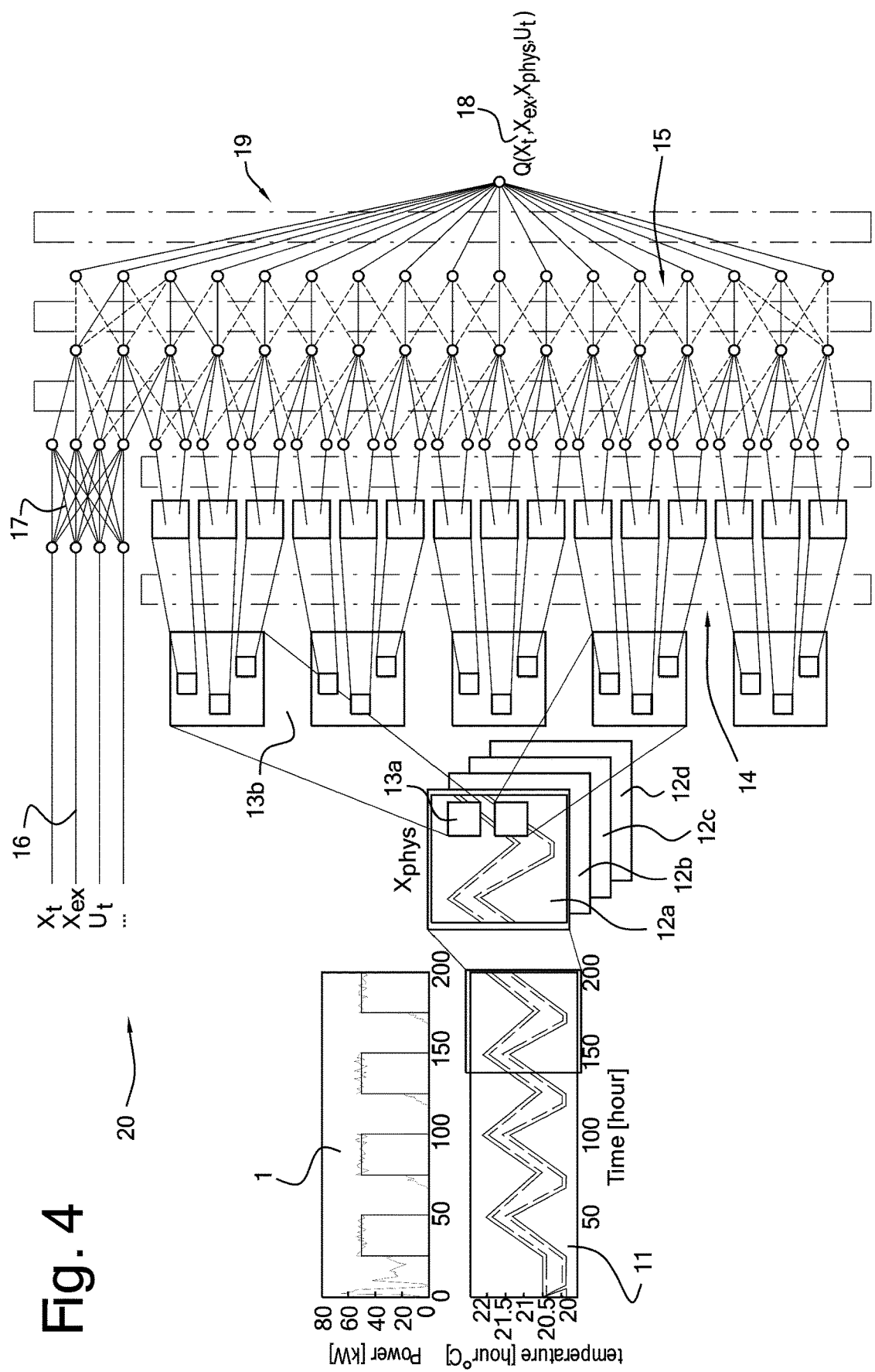

Fig. 5

Algorithm 1 Calculating the binning vector $b_k$ from $x_k$

Input: $x_k, \Delta b$
1: let $b_k$ be zeros everywhere
2: for $i = 1, \ldots, |\mathcal{D}|$ do
3:     calculate $SoC_k^i = \frac{T_k^i - \underline{T}_k^i}{\overline{T}_k^i - \underline{T}_k^i}$
4:     retrieve bin index $j^* = \arg\max_j b_{s,j} | b_{sk,j} \leq SoC_k^i$
5:     $b_{k,j^*} \leftarrow b_{k,j^*} + 1$
6: end for
7: return $\widehat{Q}^* = \widehat{Q}_N$

Fig. 6

Algorithm 2 Model-assisted Fitted Q-iteration using a forecast of the exogenous data

Input: $\mathcal{F} = \left\{ x_l, u_l, x'_l, u_l^{phys} \right\}_{l=1}^{\#\mathcal{F}}, \hat{X}_{ex} = \{\hat{x}_{ex,k}\}_{k=1}^{T}$,
1: let $\widehat{Q}_0$ be zero everywhere on $X \times U$
2: for $N = 1, \ldots, T$ do
3:     for $l = 1, \ldots, \#\mathcal{F}^{\mathcal{L}}$ do
4:         $r_l \leftarrow \rho\left(x_l, u_l^{phys}, \lambda\right)$
5:         $\hat{x}'_{ex,l} \leftarrow \hat{x}'_{ex,l}, \hat{S}'_l$
6:         $Q_{N,l} \leftarrow r_l + \min_{u \in U} \widehat{Q}_{N-1}(\hat{x}'_l, u)$
7:     end for
8:     use regression to obtain $\widehat{Q}_N$ from
        $\mathcal{T}_{reg} = \left\{ ((x_l, u_l), Q_{N,l}), l = 1, \ldots, \#\mathcal{F}^{\mathcal{L}} \right\}$
9: end for
10: return $\widehat{Q}^* = \widehat{Q}_N$

METHODS, CONTROLLERS AND SYSTEMS FOR THE CONTROL OF DISTRIBUTION SYSTEMS USING A NEURAL NETWORK ARCHITECTURE

The present invention relates to methods, controllers and systems for the control of distribution systems like energy distribution systems, e.g. heat or electrical power distribution as well as software which when executed on a processing engine is able to perform any of such methods.

BACKGROUND OF THE INVENTION

Controlling the demand flexibility of energy constrained flexibility (ECF) sources such as an Electric Vehicle, a Heat Pump, or an HVAC system is known based on model predictive control [1] or completely model-free Reinforcement Learning [2].

When applied in a demand response setting, a desired outcome of such a control technique is a proposed power and/or energy to be consumed by any number of devices during the next control step.

Different objectives need to be considered including network constraints such as not overloading the system, meeting at least minimum energy requirements as well as operating in an economical manner despite time varying prices, e.g. when energy is obtained from an energy auction.

When considering model-based control, one needs to construct a model of the flexibility of the source to be controlled, i.e. in how far a device is able to modify its energy requirements or be flexible in its demands. This can be a challenging engineering task and depending on the economic value of the model-based controller such a model can be economically interesting or not as the case may be.

A typical advantage of model-based techniques is that one can incorporate domain knowledge directly in the model. The main disadvantage is that the model needs to be accurate, tuned and maintained. The latter two aspects are reasons why Model Predictive Control (MPC) is preferably applied in very specific domains where the controller is continuously monitored by human experts, e.g. in the chemical industry.

This practicality can be at least partially mitigated by model-free control [2]. However, it is a standard way of working to cast the problem in the form of an MDP (Markov Decision Process) or a Partially Observable Markov Decision Process (POMDP). This allows working with concepts such as a Q-function capturing the value of control actions. The main problem here however is that an MDP suffers from dimensionality and scalability, i.e. for a large state dimensionality (e.g. $>5/>10^5$ possible states) most conventional techniques become impractical as the value of each state has to be understood and such exhaustive techniques clearly scale exponentially with the state dimensionality.

Sensor data at system or device level is either available now or can be provided in future systems, which sensor data gives an indication of the state of the system, e.g. room temperature can be measured by one sensor in a building or in a hot water tank, the water temperature at one or several layers can be measured. This information can be seen as partial state information e.g. by definition, as a temperature like a building temperature or the temperature of walls furniture need not be measured directly but can be a "feature" representing this dynamics which can be identified based upon historical information. This extends the available state information by adding historical state information.

For larger systems, the dynamics between the features measured by different sensors is coupled to the state space. This information needs to comprise all state information, e.g. in a hot water tank with different temperature sensors or "cluster of sensors", the dynamics are clustered and control therefore becomes cluster control, e.g. when controlling a large cluster of ECF using an energy auction based dispatch mechanism.

For example, if a hot water storage or building has 10 sensors and measurements over the last 10 time steps (e.g. 15 min resolution) are taken into a matrix representation of the state, this results in a 100-dimensional state space.

Referring again to cluster control, an aggregation step can be used to reduce dimensionality if the different ECFs in the clusters are aggregated for a certain state, e.g. all batteries with a SoC (State of Charge) between 0.2 and 0.3 are grouped together, e.g. a binning approach can be selected and all the batteries with SoC between 0.2 and 0.3 can be placed in one bin.

REFERENCES

[1] J. Cigler, D. Gyalistras, J. Sirok ̆ y, V. Tiet, L. Ferkl, "Beyond theory: the challenge of implementing model predictive control in buildings" in: Proceedings of 11th Rehva World Congress, Clima, 2013.

[2] O'Neill, D.; Levorato, M.; Goldsmith, A.; Mitra, U., "Residential Demand Response Using Reinforcement Learning," in Smart Grid Communications (SmartGridComm), 2010 First IEEE International Conference on, vol., no., pp. 409-414, 4-6 Oct. 2010

[3] Kara, E. C.; Berges, M.; Krogh, B.; Kar, S., "Using smart devices for system-level management and control in the smart grid: A reinforcement learning framework," in Smart Grid Communications (SmartGridComm), 2012 IEEE Third International Conference on, vol., no., pp. 85-90, 5-8 Nov. 2012

[4] Wei Zhang; Kalsi, K.; Fuller, J.; Elizondo, M.; Chassin, D., "Aggregate model for heterogeneous thermostatically controlled loads with demand response," in Power and Energy Society General Meeting, 2012 IEEE, vol., no., pp. 1-8, 22-26 Jul. 2012

[5] Bertsekas, convex optimization algorithms.

[6] S. Koch, J. L. Mathieu, and D. S. Callaway, "Modeling and control of aggregated heterogeneous thermostatically controlled loads for ancillary services," in Proc. 17th IEEE Power Sys. Comput. Conf. (PSCC), Stockholm, Sweden, August 2011, pp. 1-7.

[7] E. C. Kara, M. Berges, B. Krogh, and S. Kar, "Using smart devices for system-level management and control in the smart grid: A reinforcement learning framework," in Proc. 3rd IEEE Int. Conf. on Smart Grid Commun. (SmartGridComm), Tainan, Taiwan, November 2012, pp. 85-90.

[8] D. Ernst, P. Geurts, and L. Wehenkel, "Tree-based batch mode reinforcement learning," Journal of Machine Learning Research, pp. 503-556, 2005.

[9] M. Riedmiller, "Neural fitted Q-iteration-first experiences with a data efficient neural reinforcement learning method," in Proc. 16th European Conference on Machine Learning (ECML), vol. 3720. Porto, Portugal: Springer, October 2005, p. 317.

[10] V. Mnih, K. Kavukcuoglu, D. Silver, A. A. Rusu, J. Veness, M. G. Bellemare, A. Graves, M. Riedmiller, A. K. Fidjeland, G. Ostrovski et al., "Human-level control through deep reinforcement learning," Nature, vol. 518, no. 7540, pp. 529-533, 2015.

[11] Frederik Ruelens, Bert Claessens, Stijn Vandael, Bart De Schutter, Robert Babuska, Ronnie Belmans "Residential Demand Response of Thermostatically Controlled Loads Using Batch Reinforcement Learning", CORR (ARXIV) vol. abs/1504.02125, 8 Apr. 2015 incorporated herein by reference in its entirety.

[12] "Experimental analysis of data-driven control for a building heating system", Giuseppe Tommaso Costanzo, Sandro Iacovella, Frederik Ruelens, T. Leurs, Bert Claessens, incorporated herein by reference in its entirety.

[13] Iacovella, S.; Ruelens, F.; Vingerhoets, P.; Claessens, B.; Deconinck, G., "Cluster Control of Heterogeneous Thermostatically Controlled Loads Using Tracer Devices," in *Smart Grid, IEEE Transactions on*, vol. PP, no. 99, pp. 1-9.

[11] Frederik Ruelens et al describes a batch reinforcement learning to control a demand response system. It does not have the capability to learn based on a sequence of historical observations. This document assumes that there is no dependency on the history of the process given the current observation, i.e. at any given time t the current observation Xt contains all relevant information to optimally control the target system. This can be stated by requiring that the process of observations and actions is memoryless and obeys the Markov property. Many real world systems however, do not have this property. In such systems, the current observation is not sufficient to determine the optimal control action. This means that the system is only partially observable and has a hidden state which can only be inferred from historic observations. These methods cannot control such systems.

[10] V. Mnih et al disclose in "Human level control through deep reinforcement learning" Nature, vol 518, no 7540, 25 Feb. 2015, pages 529 to 533, a convolutional neural architecture to represent a state-action value function. The Markov property does not hold in this setting. They do not consider learning features over time. A sequence of historic information is stored but this sequence is however stored using a separate image channel dimension that is treated differently from other inputs. The channel dimension is not processed by the convolutional filters of the network. This amounts to learning local correlations over all input dimensions except the time dimension and then simply summing over all time steps. The entire sequence of historic observations is flattened by this summation, meaning that higher level network layers no longer have access to the historic information and cannot condition their output on it. While this method is sufficient to detect changes between neighbouring observations (e.g. detection of moving objects in a sequence of images), it lacks the ability to learn more complex time dependent patterns.

SUMMARY OF THE INVENTION

An object of the present invention is to provide methods, controllers and systems for the control of product distribution systems like energy distribution systems, e.g. heat or electrical power distribution as well as software which when executed on a processing engine is able to perform any of such methods. In particular, controlling product distribution systems like energy distribution systems based on a system model suffers from the problem that a suitable system model must be developed for each different installation. In case the system is changed the model must be adapted to that change. An aim of the present invention is to avoid the need to develop a system model.

Demand response systems conventionally use paging to control remote switches. Embodiments of the present invention provide two-way communication between a device or a cluster of devices and a control function for the network. This control function can include a central controller and/or cluster controller and/or device controller and/or a legacy device controller.

Accordingly, in one aspect the present invention provides a computer based method of controlling demand of a physical product to be distributed to constrained cluster elements grouped in clusters in a demand response system, the method comprising the steps of:

determining the amount of the physical product to be distributed to the constrained cluster elements during a next control step using a control technique in the form of Reinforcement Learning (RL), whereby the control technique learns from interaction with the demand response system to be controlled, the method comprising an feature extraction step of:

inputting to a convolutional neural network historical observations of at least one cluster of the demand response system or derivatives of the historical observations aggregated in one or more 2D (two-dimensional) grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network executes 2D convolutions and learns to extract local convolutional features from combinations of local time and aggregated local state variations of the cluster elements in the 2D grid structures, the method further comprising:

inputting at least the extracted local convolutional features to a first neural network, the first neural network outputting at least an approximation of a state-action value function which provides values for the at least one cluster associated with each combination of the at least one cluster being in a state and taking an action, determining or calculating a control action, the control action being a preferred combination of taking an action and a cluster being in a state, or being derived from, a preferred combination of taking an action and a cluster being in a state, and distributing target amounts of the physical product to be consumed or liberated by the cluster elements during a next control step in accordance with the control action. The first neural network can be a fully connected neural network.

The use of aggregated input data reduces the dimensionality of the control problem. The use of a convolutional network relies on correlations in the input data and reduces the computational intensity required and shortens training times. Limiting the first fully connected neural network to be a second neural network that takes over a ready processed output of the convolutional neural network also reduces the computational intensity required and also shortens training times.

Embodiments of the present invention allow an overview of a network. Using two-way communications between the individual consumer devices or clusters of devices and the energy distribution network, the network has end-to-end visibility to not only have a complete picture of the infrastructure from consumer premises to the head end but also of temporal patterns extracted by the convolutional neural network.

The control technique is preferably model-free. This avoids the need to investigate and construct complex system models and in fact allows the present invention to be used in cases where the system model is not even known.

The state-action value function can be a Q-function $(Q(x,u))$. This algorithm has been found to converge quickly.

The control action and exogenous state information is preferably input to a second neural network which is connected as an input to the first neural network. The method also can include merging exogenous state information and the control action with the extracted convolutional local features of the convolutional neural network. This is advantageous because not only does the exogenous information include relevant values such as an outside temperature and time of day, but it also includes the control action. This allows the controller to learn an approximation of a Q function as an output.

Before merging exogenous state information and the control action with the extracted convolutional local features of the convolutional neural network, a separate feature extraction can be performed, wherein the exogenous state information and the control action is first fed into the second neural network, this second neural network mapping the exogenous state information and the control action into a learnt internal representation that is combined with the extracted convolutional local features in a next hidden layer. This is advantageous as a further development of how the exogenous information including the control action allows the controller to learn an approximation of a Q function as an output.

The second neural network can be fully connected. As the dimensionality of the exogenous data is usually low, the second neural network can be fully connected without increasing computation or training times substantially.

The hidden layer is fully connected. As this is a higher layer it can be fully connected without increasing computation or training times substantially.

The convolutional neural network first captures patterns in the 2D grid structures and the convolutional neural network and the first and second neural networks learn a mapping from the aggregated cluster states and exogenous data including the control action to the target amounts. The combination of different types of neural networks makes this step efficient.

The 2D grid structures have one dimension representing all observations of a cluster state at fixed time steps and the second dimension corresponds to changes over time of values of each of a plurality of state variables of cluster elements at all time steps, the 2D feature extraction operations being applied over time as well as space resulting in the identification of spatiotemporal features that identify local structure in the state information as well as in the history. The identification of spatiotemporal features is important in demand response control systems which need to perform well over time.

With the method features can be learnt that represent changes in state values that occur over multiple time steps. The learnt features are used as input by higher network layers of both the first fully connected neural network. This allows correlations to be determined which cannot be found from a single input.

The convolutional network and the first and the second neural networks are trained together. This is an efficient method of training.

The present invention also provides a controller or a computer network architecture for controlling demand of a physical product to be distributed to constrained cluster elements grouped in clusters in a demand response system, comprising:

Means for determining the amount of the physical product to be distributed to the constrained cluster elements during a next control step using a control technique in the form of Reinforcement Learning (RL), whereby the control technique learns from interaction with the demand response system to be controlled, Means for extracting features adapted to:

input to a convolutional neural network historical observations of at least one cluster of the demand response system or derivatives of the historical observations aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network is adapted to execute 2D convolutions and learns to extract local convolutional features from combinations of local time and aggregated local state variations of the cluster elements in the 2D grid structures;

the convolutional neural network being adapted to output the extracted local convolutional features to a first neural network, the first neural network being adapted to output at least an approximation of a state-action value function which provides values for the at least one cluster associated with each combination of the at least one cluster being in a state and taking an action, and means for determining or calculating a control action being a preferred combination of taking an action and a cluster being in a state, or being derived from a preferred combination of taking an action and a cluster being in a state, and means for distributing target amounts of the physical product to be consumed or liberated by the cluster elements during a next control step in accordance with the control action.

The first neural network can be a fully connected neural network. The control technique can be model-free.

Preferably, the state-action value function is a Q-function $(Q(x,u))$.

The product to be distributed can be heat energy or electrical power.

Preferably, a second neural network is adapted to allow inputting of the control action and exogenous state information to the second neural network which is connected as an input to the first neural network.

Preferably exogenous state information and the control action can be merged with the extracted convolutional local features of the convolutional neural network.

Preferably, before merging exogenous state information and the control action with the extracted convolutional local features of the convolutional neural network, a separate feature extraction is performed, wherein the exogenous state information and the control action is first fed into the second neural network, this second neural network mapping the exogenous state information and the control action into a learnt internal representation that is combined with the extracted convolutional local features in a next hidden layer.

Preferably, the second neural network is fully connected as well as the hidden layer.

The convolutional neural network is preferably adapted to first capture patterns in the 2D grid structures and the convolutional neural network and the first and second neural networks are adapted to learn a mapping from the aggregated cluster states and exogenous data and the control action to the target amounts.

Preferably the 2D grid structures have one dimension representing all observations of a cluster state at fixed time steps and the second dimension corresponds to changes over time of values of each of a plurality of state variables of cluster elements at all time steps, the 2D feature extraction operations being applied over time as well as space resulting in the identification of spatiotemporal features that identify local structure in the state information as well as in the history.

Preferably the features that are learnt represent changes in state values that occur over multiple time steps. The learnt features are preferably used as input by higher network layers of at least the first fully connected neural network and optionally also of the second neural network.

The convolutional network and the first and the second neural networks are preferably adapted such that they can be trained together at the same time.

The present invention also provides a controller for controlling demand of a physical product to be distributed to constrained cluster elements grouped in clusters in a demand response system, comprising:

Means for determining the amount of the physical product to be distributed to the constrained cluster elements during a next control step using a control technique in the form of Reinforcement Learning (RL), whereby the control technique learns from interaction with the demand response system to be controlled, Means for extracting features adapted to:

input to a convolutional neural network historical observations of at least one cluster of the demand response system or derivatives of the historical observations aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network is adapted to execute 2D convolutions and learns to extract local convolutional features from combinations of local time and aggregated local state variations of the cluster elements in the 2D grid structures, the convolutional neural network being adapted to output the extracted local convolutional features to a first neural network, the first neural network being adapted to output at least an approximation of a state-action value function which provides values for the at least one cluster associated with each combination of the at least one cluster being in a state and taking an action, and means for determining or calculating a control action being a preferred combination of taking an action and a cluster being in a state, or being derived from a preferred combination of taking an action and a cluster being in a state, and means for distributing target amounts of the physical product to be consumed or liberated by the cluster elements during a next control step in accordance with the control action.

The present invention also provides a computer program product comprising code which when executed on a processing engine is adapted to carry out any of the methods of the invention. A non-transitory machine readable signal storage means can store the computer program product.

Embodiments of the present invention use deep approximation architectures which are an efficient method of extrapolating data over unseen states for demand response applications in order to provide methods, controllers or systems for the control of distribution systems like product distribution systems of which energy distribution systems, e.g. heat or electrical power distribution, are one example, as well as software which when executed on a processing engine is able to perform any of such methods.

Embodiments of the present invention provide a model-free control technique mainly in the form of Reinforcement Learning (RL) whereby problems of the prior art are at least partially mitigated as the controller learns from interaction with the system to be controlled, in order to provide methods, controllers or systems for the control of distribution systems like product distribution systems of which energy distribution systems, e.g. heat or electrical power distribution, are one example, as well as software which when executed on a processing engine is able to perform any of such methods.

Embodiments of the present invention provide methods, systems or controllers that address at least one of two problems:

1. Partial information: As a model-free controller will take actions based upon a direct measurement, hidden observables relevant for the dynamics of the cluster of devices such as ECF need to be taken into account. Embodiments of the present invention remedy this by adding a full information vector in the input of the state comprising not just the state value for a current time "t" as measured directly but also the previously measured states, at times "t−2T", "t−T", . . . t" etc.

2. Dimensionality

Embodiments of the present invention address the problem of avoiding a state description of high dimensionality. Although at an aggregated level the aggregated state dimensionality can be reduced, for heterogeneous clusters one still requires a state dimensionality of typically 10 (e.g. 10 energy states), while taking into account historical information, say in 10 time steps. This results in a state dimensionality of at least 100 which is outside the scope of typical RL algorithms if they are built upon an MDP formalism. Even for a single ECF system the same issues arise, e.g. a hot water storage comprising 10 temperature sensors taking into account historical information, say 10 time steps, suffers the same problems.

Namely, if the state dimensionality is 100, and each dimension can have say 10 values, this gives rise to $10^{100}$ possible states which is more than there are atoms in our visible universe. Such a state dimensionality is not tractable to compute.

While shallow neural networks provide general function approximation capabilities, embodiments of the present invention deal with the issue of efficiently representing highly complex functions, by using deep architectures. Deep neural networks comprise multiple non-linear transformations that create increasingly abstract representations of the inputs. These transformations enable the network to represent the desired function more easily. Moreover, it can be shown that functions exist for which shallow architectures require exponentially more capacity as compared to deeper architectures as used in embodiments of the present invention.

Embodiments of the present invention incorporate hidden state information and exogenous information for determining a demand response for clusters of constrained flexible sources using a deep approximation architecture. The exogenous information is not necessarily included and is preferably not included into the system in the same way as state information of devices. The deep approximation architecture is preferably a deep regression architecture based on a convolutional neural network (CNN). Convolutional neural networks have a 2D input grid and embodiments of the present invention include within the state definition a history of measured states or a derivate of this. In order to apply a convolutional neural network architecture to this data, an additional feature extraction step is preferably included. The historical observations of the system are aggregated in a 2D grid structure in which one dimension represents time steps and the other captures the distribution of states of a parameter such as energy states over cluster elements, which is referred to as the cluster state. Dimensionality of the cluster state can be reduced by aggregating data. For example, the aggregation method could be binning cluster elements according to their local parameter such as their local energy state (temperature, battery capacity, State of Charge (SoC), State of health (SoH), . . . ). Multiple 2D grids can be input at the same time. For example, if cluster behavior is likely to be correlated, a plurality of 2D grids, each for a cluster of N clusters could be input in parallel. For example one 2D grid can be for a cluster of EV's, another 2D grid can be a cluster of thermostatically controlled loads (TCL's) and yet another 2D grid can be for a cluster of nuclear power plants, all of these clusters consuming electrical power.

Embodiments of the present invention use a convolutional network to look for local structures in the data which allow to identify or extract a spatiotemporal feature. The aggregation method for the input data is preferably so designed that it supports this feature extraction.

The time step data and the aggregated data make up a 2D grid that is used as input to a convolutional neural network. In the network, the 2D input grid is operated on by 2D convolutions in a convolutional neural network which learns to extract features over local time and state variations. The algorithm deployed can be a Fitted Q-iteration (FQI). The output of the CNN is fed into a first fully connected neural network. The output of the latter neural network is preferably an approximation of the state-action value function such as a Q-function ($Q(x,u)$), which provides a value of being in state "x", and taking action "u". This information is then used to determine, e.g. calculate the control action which is the proposed control action for the next time step. The control action is fed back with exogenous data and is input to a second fully connected network whose output is provided to the first fully connected neural network where it is merged with the output of the convolutional neural network.

Convolutional Neural Networks are made up of neurons that have learnable weights and biases. Each neuron receives some inputs, performs a dot product and optionally follows it with a non-linearity. The whole network still expresses a single differentiable score function. The input is one or more 2D grids and the output is class scores which can be used to calculate the next control action based on the preferred result.

Convolutional neural networks use 2D grids as inputs which make the forward function more efficient to implement and vastly reduces the amount of parameters in the network. In particular the layers of a convolutional neural network have neurons arranged in 3 dimensions, namely width, height, depth. The neurons in a layer will only be connected to a small region of the layer before it, instead of all of the neurons as in a fully-connected manner. Moreover, the final output layer of the convolutional neural network is a single vector of class scores, arranged along the depth dimension.

Embodiments of the present invention make use of a first convolutional network and a subsequent second fully connected neural network. A fully connected neural network receives an input from the first convolutional neural network and transform it through a series of hidden layers. Each hidden layer is made up of a set of neurons, where each neuron is fully connected to all neurons in the previous layer, and where neurons in a single layer function completely independently and do not share any connections. The last fully-connected layer is called the "output layer" and outputs the class scores.

Every layer of a Convolutional neural network transforms one volume of activations to another through a differentiable function. Three main types of layers can be used to build a convolutional neural network architecture that can be used with embodiments of the present invention:

Convolutional Layer, ReLU layer and a Fully-Connected Layer whereby an additional small fully connected layer is used for the input of exogenous data. The stack of these layers forms a convolutional neural network architecture as used in embodiments of the present invention. The input holds the 2D grid data.

The convolutional layer does the feature recognition in the 2D grids. The parameters of this layer consist of a set of learnable filters. Every filter is small along width and height but extends through the full depth of the input volume. Each filter is convoluted across the width and height of the input volume, producing a 2-dimensional activation map of that filter. The dot product is calculated between the entries of the filter and the input. Each neuron is connected to only a local region of the input volume. The spatial extent of this connectivity is a hyperparameter called the receptive field of the neuron. The extent of the connectivity along the depth axis is always equal to the depth of the input volume. The network will learn filters that activate when they see some specific type of feature at some space/time position in the input. Stacking these activation maps for all filters along the depth dimension forms the full output volume. Every entry in the output volume can thus also be interpreted as an output of a neuron that looks at only a small region in the input and shares parameters with neurons in the same activation map.

A ReLU layer acts as an activation function to be used. However the present invention is not limited thereto and the skilled person can use other layers such as sigmoid, linear, tan h, radial basis function, softplus and softmax, and different dialects. A pooling layer is an optional layer that might help to get more stability.

A convolutional neural network architecture for use in embodiments of the present invention is shown in FIG. 1 and FIG. 4 having an input of one or more 2D grids 12, a convolutional neural network architecture 20 with a convolutional neural network 14 having a convolutional layer, a ReLU layer, and fully connected layers in the first neural network 15 and the second neural network 17. The convolutional layer computes the output of neurons 13b that are connected to local regions 13a in the input, each computing a dot product between their weights and the region they are connected to in the input volume. The ReLU layer applies an elementwise activation function. The fully-connected layer computes the class scores.

A pooling layer could be added to the network. Pooling introduces translation invariance and works well for object detection, but it comes at the cost of losing location information. One option would be to extend pooling over the time dimension.

LSTM (Long Short-Term Memory) layers can also be used. The LSTMs would then be responsible for learning time dependencies.

Embodiments of the present invention can be applied to distribution systems in which the dynamics of the system is difficult or tiresome to model. Neighboring states have a correlation, i.e. a state N+1 has to have some influence on the dynamics of state N as the convolutional neural network makes use of this to extract spatiotemporal features.

The embodiments of the present invention work advantageously when there is hidden information. In other words it is not possible to identify directly such information from observing the current status. The embodiments of the present invention work advantageously when the hidden state information has long range time dependencies. The neural architecture 20 of embodiments of the present invention is able to detect events in the history that influence the current behaviour through a hidden state, but are no longer visible in the current observations.

As used in embodiments of the present invention, the state information is not just the historic cluster states, but also the temperature, time of day, solar irradiation, applied control action. All can be equally relevant, and are preferably be integrated at the same level. Exogenous information is added deeper in the architecture. Embodiments of the present invention use additional state information, e.g. outside temperature or day in the week. This exogenous information is preferably treated differently than the state-time features which are input, for example in the form of concatenated aggregations. The exogenous information is not added to the state-time matrix but instead is merged into the neural network architecture higher up, after the convolutional layers.

The exogenous state information and also any control action is added higher up in the architecture after first going through one feature extraction layer itself. Typically the dimension is quite small, on the order of say 4-5 and it is not reasonable to assume local correlation so convolution need not be applied. Instead a standard, rather dense and small, neural network 17 is used to extract some features before merging with the output of the convolutional neural network 14 in the fully connected neural network 15.

Hence embodiments of the present invention use a neural network architecture 20 an architecture comprised of 2 separate network components that are then merged in the top layers. Before merging the exogenous information with the convolutional feature extraction, a separate feature extraction is used to process this information. While the historical cluster state-time information is processed by the convolutional network 14, the exogenous state information is first fed into a standard fully connected feedforward network 17. This network 17 maps the exogenous state information into a learnt internal representation that can then be combined with the convolutional features in the next fully connected hidden layer. Specifically learning a representation, before merging it with the historic cluster state, allows the network to first capture patterns in the separate data inputs and to learn more easily a mapping from the combined cluster state and exogenous data to the target outputs.

Incorporating Time Information

Historic state observations are represented as a 2D grid 12 where one dimension represents the system or device state at a fixed time step and the second dimension corresponds to changes over time, i.e. column c in the grid gives all observations of the system state at time c and row r gives the value of the $r^{th}$ state variable at all time steps. The resulting 2D grid is used as input to a convolutional neural network (CNN) 14 which maps the history of state information to a value. Time and state dimensions are treated in the same way and 2D convolution operations are applied over time as well as space. This results in the identification of spatiotemporal features that identify local structure in the input state information as well as in the history. This makes it easy to learn features that represent events (e.g. changes in state values) that occur over multiple time steps. These features can then be used as input by higher network layers. A particular aspect of embodiments of the present invention is that state and time dimensions are treated the same and the network applies the convolution operations over the state and time dimensions. This means that the network will learn to identify local features over state and time.

Consider the example in FIG. 1, where the evolution 11 of the system state over time has a sinusoidal shape. By treating the time dimension as another image input dimension to the CNN 14, features can be learnt that capture the local evolution over time and easily identify the shape of the curve.

MERITS OF THE INVENTION

An advantage of using a deep architecture in embodiments of the present invention is that it allows to expand the state description to include the historic information to 'learn' non-observable features relevant for the dynamics. Furthermore it allows to include the full state distribution which is relevant for heterogeneous clusters.

One aspect of the present invention is storing preprocessed historic information in a grid structure to be processed by a convolutional neural network. The preprocessing of historic information into a grid structure allows the method or system to learn local correlations over the time dimension. This is implemented by passing this grid to the convolutional neural network that can now extract local correlations (i.e. features) over time. The final neural network processes the output of the convolutional net to explicitly condition control actions on the extracted historic features. Hence, the time dimension is treated in the same manner as other input signals and not added to a separate channel dimension. Local correlations are now learnt over both time and all other input dimensions. This has the effect of learning to extract features that represent patterns over time. This has several advantages:

Methods or systems according to the present invention can extract features of the historic information that show patterns in how inputs change over time Methods or systems according to the present invention can show patterns that cannot be detected by simply summing features over the time dimension Methods or systems according to the present invention can extract more information from longer time sequences Methods or systems according to the present invention explicitly deal with time related information and this information is passed up through the neural network architecture, enabling a controller to condition the control output on this information Methods or systems according to the present invention can extract relevant historic information that may no longer be visible in the most recent observations

BRIEF DESCRIPTION OF THE DRAWINGS

FIG. 2 is a schematic flow diagram of a three step process according to an embodiment of the present invention.

FIG. 3b is the aggregated power over time for the TCL population of FIG. 3a.

FIG. 4 is a schematic representation of another neural network architecture according to an embodiment of the present invention.

FIG. 5 is a flow for algorithm 1 for use with embodiments of the present invention.

FIG. 6 is a flow for algorithm 2 for use with embodiments of the present invention.

DEFINITIONS

Figure 1:
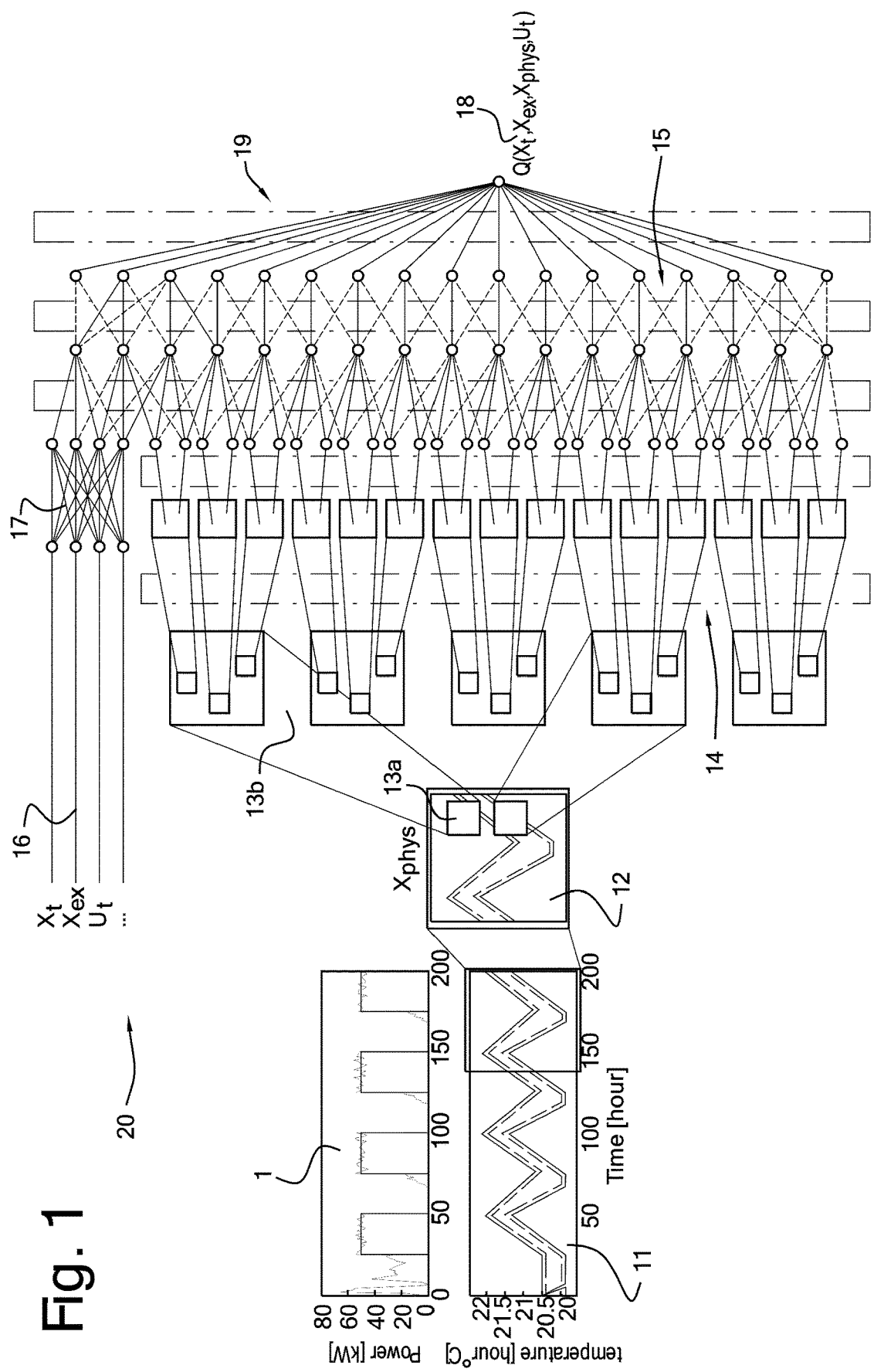
FIG. 1 is a schematic representation of a neural network architecture according to an embodiment of the present invention.

A "product" or a "physical product" as used with the invention is to be interpreted widely to include consumption or delivery of an item that satisfies a market's want or need. Such a product can be any of a liquid, gas or a solid material as well as light or other form of radiation, an energy such as heat or electrical energy or signals such as telephone calls in a telecommunications network. Examples given in the text includes the provision of electrical or heating power. Other examples are as follows:

The present invention could be used to model global warming whereby the state observable can be an average day temperature and/or an average night temperature, hours of sunlight etc. in different geographic areas. The cluster can be the earth itself. Aggregation would be applied to combine observed data from different (ideally related) geographic areas. The reward function can be retardation of the loss of glaciers or reducing the rise of the sea levels. The item to be distributed is the carbon dioxide emissions of a geographic area.

The present application can be applied immersion lithography where the illuminating laser light changes properties of material in the optical paths, e.g. lens properties with time. The pupil shape has an impact on the dynamics in the lithographic scanner, e.g. optics degradation which happens over a short time, e.g. over hours. Hence, pupil planes can be aggregated and input as 2D grids with time as one axis and spatiotemporal time-state features are extracted relating to the deterioration in the material properties such as lens properties. The thermal dynamics of lenses is slow, and a time-state feature is learnt and the system controls the laser energy to compensate for transmission losses induced by laser light which are temporary and hence can recover again with time if the pupil shape is adapted correctly. The control action controls the laser light source.

The present invention may be applied to logistics, e.g. delivery of goods from a supply depot. The goods can be clustered, e.g. only pharmaceutical products are considered. The various pharmaceutical products are aggregated by binning the number of pharmaceuticals with a number of therapeutic units stored in the supply depot. Ideally the inventory should be kept low but this would worsen delivery times. The therapeutic units are delivered in accordance with the control action.

The term "availability function" used in the text relates to a form of bidding function in which a power or energy a device wants to consume or can produce is defined in function of a heuristic variable such as (to name only two) a priority (i.e. a necessity to consume or supply) or a state of charge assigned to each level of power or energy to be consumed or to be produced. For each consuming or producing device the value of the heuristic variable such as the priority or state of charge can be assigned for each power or energy consumption level or for each power or energy generation level. An availability function describes a relation between energy or power consumptions or generations and values of the heuristic variable such as values of priority or of state of charge for those energy or power consumptions or generations. Thus, a value of the heuristic variable such a value of the priority or the state of charge is assigned for distributing an energy flow. The assignment of each value of the heuristic such as a priority or state of charge level for each power or energy generation level for each device can be assigned by the consumer manually using an interface on the device or can be assigned by the energy distribution network operator or any combination of these.

For example, a user and a user device receiving and using energy or power is preferably required to assign a decreasing function of energy or power with respect to priority. The assignment of a high priority should be associated with a small amount of energy or power to be supplied as many user devices being able to assign a high priority to a large amount of energy or power could cause an imbalance. Thus the power or energy to be supplied to a user device is preferably a decreasing function such as a step-wise decreasing function or a stepwise monotonically decreasing function with respect to the heuristic variable such as priority. In the same way the lower the state of charge of a user device is, the greater the need to charge the user device, and hence the priority is high for a low state of charge and low for a high state of charge. Thus the power or energy to be supplied to a user device is preferably a decreasing function such as a step-wise decreasing function or a monotonically decreasing function with respect to the level of state of charge of the user device.

DETAILED DESCRIPTION OF THE INVENTION

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment described below was chosen and described in order to best explain the principles of the invention and the practical application, and to enable others of ordinary skill in the art to understand the invention and its application for other embodiments with various modifications as are suited to the particular use contemplated.

EMBODIMENT

Figure 16:
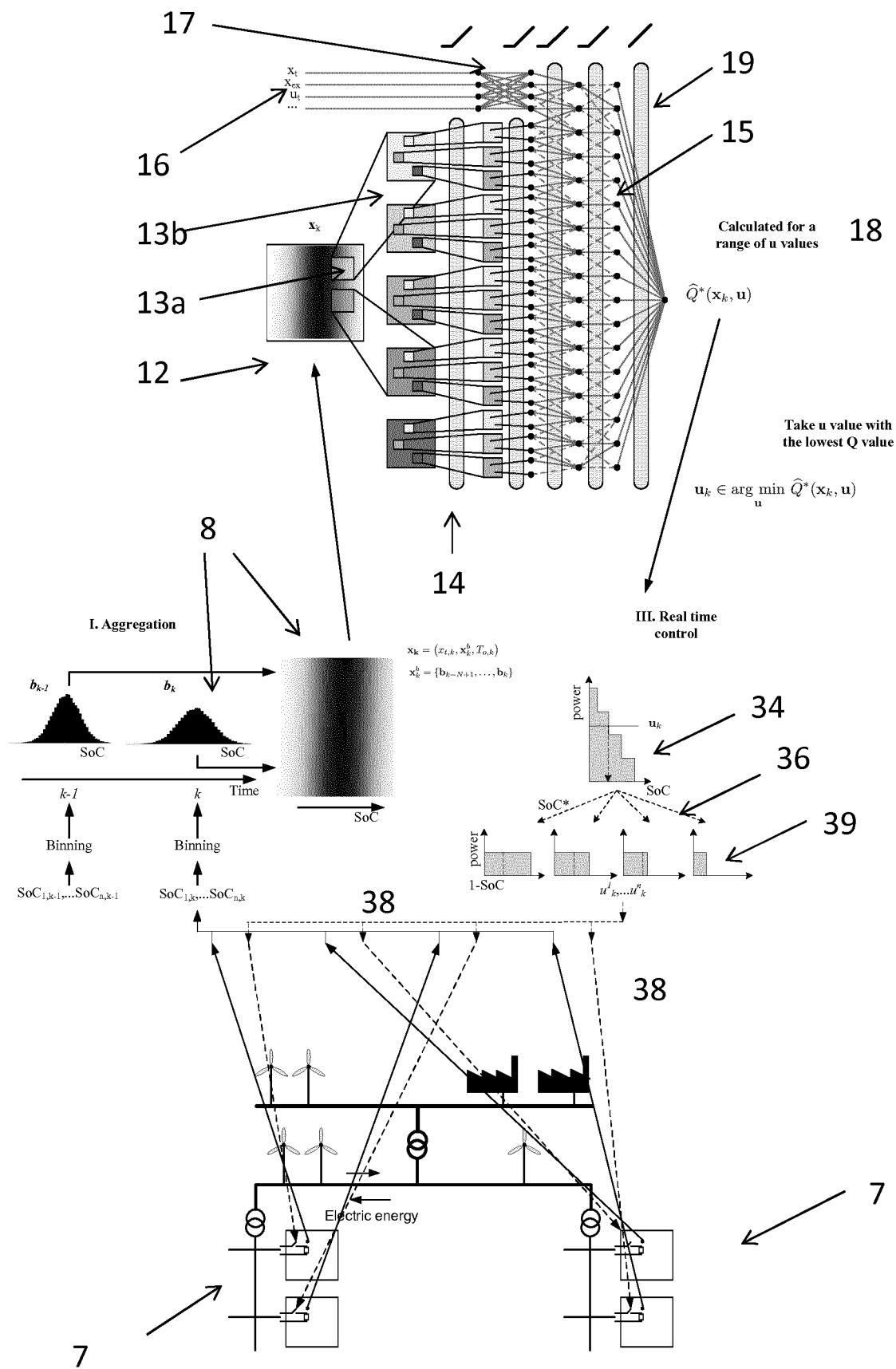
FIG. 16 illustrates operating a network according to an embodiment of the present invention.

An embodiment of the present invention will be described with reference to FIGS. 1 to 8. FIG. 16 illustrates an overview of a network according to embodiments of the present invention.

As an example of this embodiment, a fitted q iteration [8,9]—"FQI" as opposed to conventional q-learning [7]—is applied for decision making on top of an optional aggregated state representation. Use of other reinforcement learning algorithms is included within the scope of the present invention such as, for example:
  The temporal difference learning family:
    online learning of a value function, including Q-learning, SARSA and gradient-TD algorithms,
    Some of these can learn while controlling the system, but learning may be slow.
    Such reinforcement learning algorithms can be combined with techniques such as Dyna (model learning), shaping (heuristic knowledge), experience replay or prioritized sweeping (sample reuse) to speed up learning.
  The policy gradient family:
    optimize a parameterized policy using gradient descent. This learns a locally optimal policy (within the set of possible policies). Examples: policy gradient, natural policy gradient, PGPE (policy gradient with parameter-based exploration), REINFORCE.
  Actor critic: learn both a value function and a policy. Can be a combination of TD-learning with a policy gradient algorithm, e.g. natural actor critic
  Batch learning can be more sample efficient, but does not learn online. Instead data is collected and a new policy is learned periodically. In the meantime the current policy is used:
    LSPI (least squares policy iteration): iterative least squares fitting to get sequence of value functions. Doesn't scale to high dimensions
    FQI: as used in this embodiment
    PILCO: Probabilistic Inference for Learning Control—learns a model with Gaussian processes. Very sample efficient, but computationally very expensive.

A goal of reinforcement learning is to optimize sequential decision making using trajectories of state, action, reward samples as opposed to learning a mapping from input samples to output samples in supervised learning or structure learning from raw input data in unsupervised learning as is a more conventional use of neural networks. The reinforcement learning algorithm should be chosen to be suitable for the speed of training required and its ability to provide the necessary output. For example, Standard Q-learning is often described in the literature but has very poor convergence properties. For example, a comparison between convergence of Q-learning and Fitted Q-iteration, has shown that FQI reaches an optimal solution about 30 times faster than Q-learning.

The training of the neural network in isolation in accordance with this embodiment of the present invention can be seen as a supervised problem, but the main differences disclosed in this embodiment compared with a standard supervised setting are:
  a sequence of neural networks is trained together, e.g. a convolutional neural network and a fully connected neural network trained as a unit
  the target outputs for the network are themselves learnt using reinforcement learning and the targets for each neural network depend on the outputs of the previous network that was trained in the previous iteration.

So the supervision in the training can be seen as an inner loop in an outer reinforcement learning loop.

This embodiment of the present invention is described in a detailed example below with reference to FIGS. 1 to 8. The decision making problem is formalised, for example, as a Markov Decision Process (MDP). A high dimensional state representation 11 can be used as an input preferably comprising a time-stepped series of aggregated state distributions [6] of either a single (see FIG. 1, reference number 12) or a parallel series (see FIG. 4, reference numbers 12a-d) of 2D aggregated state distributions 12. A convolutional neural network architecture 20 [10], preferably customized for demand response applications, is used to perform a regression algorithm in FQI.

An MDP is defined by its state space X, its action space U, and a transition function $f$:

$$x_{k+1} = f(x_k, u_k, w_k), \quad (1)$$

which describes the dynamics from $x_k \in X$ to $x^{k+1}$, under the control action $u_k \in U$, and subject to a random process $w_k \in W$, with probability distribution $p_w(\cdot, x_k)$.

The reward $r_k$ accompanying each state transition is:

$$r_k(x_k, u_k, x_{k+1}) = \rho(x_k, u_k, w_k) \quad (2)$$

Typically for demand response applications there is a cost (which is the inverse of a positive reward) instead of a reward, unless stated otherwise ρ is a cost.

An objective of this embodiment is to find a control policy h: X→U that minimises the T-stage (T is a time) cost starting from the first state $x_1$, this policy being denoted by $J^h(x_1)$:

$$J^h(x_1) = \mathbb{E}(R^h(x_1, w_1, \ldots w_T)) \quad (3)$$

with:

$$R^h(x_1, w_1, \ldots w_T) = \Sigma_{k=1}^T \rho(x_k, h(x_k), w_k) \quad (4)$$

An optimal control policy h*, for example, can satisfy the Bellman equation:

$$J^{h^*}(x) = \min_{u \in U|w \sim Pw(.|x)} \mathbb{E}\{\rho(x, u, w) + J^{h^*}(f(x, u, w))\} \quad (5)$$

The state space X comprises, for example, a plurality of data sets [6]: e.g. time-dependent state information $X_t$, controllable state information $X_{phys}$, and exogenous (uncontrollable) state information $X_{ex}$:

$$X = X_t \times X_{phys} \times X_{ex} \quad (6)$$

The time-dependent information component $X_t$ contains information 11 related to time, i.e. in time steps of, for example, nanoseconds, microseconds, milliseconds, seconds, minutes, days, months—as appropriate for application. In the present embodiment the hour of the day can be used:

$$X_t = \{1 \ldots 24\} \quad (7)$$

The choice of the size of a time step is a compromise between allowing identification of relevant spatiotemporal behavioural patterns in the input data and reduction of the computational intensity. More features relating to time can be added such as weekdays or holidays or national strikes or major power outages.

The controllable state information $x_{phys,k}$ relates to a parameter that is to be controlled, e.g. graph 11 in FIG. 1 or 4, and to be kept between upper and lower bounds. For example, for a thermostatically controlled load (TCL), this parameter can be an operational temperature $T_k^{i \circ}$ C. of each TCL where $i \in \mathcal{D}$:

$$\underline{T_k^i} < T_k^i < \overline{T_k^i} \quad (8)$$

where $\underline{T_k^i}$ and $\overline{T_k^i}$ denote the lower and upper bounds for T which can be set by an end user, for example or by other constraints as appropriate to the application.

The exogenous (e.g. uncontrollable, and/or imposed from outside) information $x_{ex,k}$ can be invariant for control actions $u_k$, but can have an impact on the dynamics of the system to be controlled. In the present invention, the exogenous information can comprise or consist of a temperature such as an outside temperature, $T_o$, and/or for example internal heating, q, (although the latter is assumed unavailable in this embodiment), or for example a solar irradiance S, that would result in radiation heating through windows, for example, or any other similar exogenous information that has an impact on the dynamics of the system to be controlled. The above list is neither limiting nor exhaustive as indicated below:

$$x_{ex,k} = (T_{o,k}, q_k, S_k \ldots) \quad (9)$$

At least a forecast of this or these exogenous information such as temperature, e.g. a relevant outside temperature, or a solar irradiance, or internal heating, is assumed available when constructing a policy h. A circumflex ^ will be used to denote a forecast.

A control action for each TCL is denoted in this embodiment as a binary value indicating if the TCL is in an OFF/ON state:

$$u_k^i \in \{0 \ldots 1\} \quad (10)$$

A preliminary state vector can be defined as (for example, at least as)

$$x_k = (x_{t,k}, T_k^i, \ldots, T_k^{|\mathcal{D}|}, T_{o,k}, S_k) \quad (11)$$

As this state vector only comprises observable state information, e.g. the operational temperature $T_o$, or a solar irradiance, the state vector can be extended by adding observed historical state samples from 11 in FIG. 1 or 4.

A typical device to be controlled can be governed by constraints, e.g. upper and lower bounds relating, for example to the safety of operating the device or relating to maxima and minima of allowable values. For this purpose a device such as a TCL can be equipped with a backup filter or a backup controller acting as a filter of the control actions resulting from the policy h. This filter can act as a mask allowing some control actions to go forward while preventing others. For example, a function B can be adapted to map a requested control action $u_k^i$ to a physical control action $u_k^{i,phys}$. This mapping may depend on a state which is important, for example, from the point of view of safety, e.g. the state $T_k^i$:

$$u_k^{i,phys} = B(T_k^i, u_k^i, \theta^i) \quad (12)$$

with $\theta^i$ containing information on upper and lower bounds of local information regarding an important parameter such as safety (not being scalded by over hot water) and/or comfort settings (warm water is sufficiently hot to provide a pleasant shower experience) or other parameters that are relevant to the operation and to limit the range of the control actions.

For example in this embodiment, $\theta^i$ is a function of $\underline{T_k^i}$ and $\overline{T_k^i}$, where B(.) [7] and can be defined as:

$$B(T_k^i, u_k^i, \theta^i) = \begin{cases} 1 & \text{if } T_k^i \leq \underline{T_k^i} \\ u_k & \text{if } \underline{T_k^i} \leq T_k \leq \overline{T_k^i} \\ 0 & \text{if } T_k^i > \overline{T_k^i} \end{cases} \quad (13)$$

A suitable reward model is to be defined in order to train the convolutional neural network, i.e. to define a successful control action. When controlling a large cluster of devices such as TCLs, one could consider for example, tracking a balancing signal or energy arbitrage. In this embodiment energy arbitrage is considered. As previously defined the reward $r_k$ accompanying each state transition is:

$$r_k(x_k, u_k, x_{k+1}) = \rho(x_k, u_k, w_k) \quad (2)$$

In this equation it is necessary to replace and update by replacing the theoretical vale $u_k$ by the actual usable value $u_k^{i,phys}$ as defined in equations 12 and 13 and to define $w_k$.

In this embodiment it is assumed that a cluster of devices such as TCl's responds to an external cost or price vector $\lambda$. Reference to cost or price does not necessarily relate to an actual billable amount but rather assigns a value of cost for the purpose of assessing control functions. For example this "cost" could be the carbon dioxide impact created by an action. It is therefore a control parameter. For example, the cost function can be defined as:

$$\rho(x_k, u_k^{phys}, \lambda_k) = P^i \Delta t \lambda_k \sum_{i=1}^{|\mathcal{D}|} u_k^{phys,i} \quad (14)$$

with P being the average power consumption of the device such as a TCL, e.g. air conditioner during the time interval $\Delta t$.

Having now defined the most important relationships, an implementation being an embodiment of the present invention including a controller is described. A three step approach 2, 4, 6 is preferred as illustrated in FIG. 2, namely first step aggregation 2, second step optimization and feature extraction 4, and third dispatch or delivery step 6.

Step 1: the first step 2 is carried out to reduce the dimensionality of the problem. Where this is not an issue this step can be missed out and the input 2D grids 12 of FIG. 1 or FIG. 4 can be populated with actual values. To reduce the size of the input data, state values 11 (FIGS. 1 and 4) of the cluster elements such as TCL's 7a to d (FIG. 2) are preferably aggregated. In the first step, state information $x_k$ as already described is retrieved from the system to be monitored.

For example, for each device such as a TCL 7a to d, the state vector $x_k$ is aggregated. One method of aggregating is to add a unit to a bin for each device such as a TCL which has a state value that lies within the range of that bin and belongs to the state vector $x_k$. This binning replaces the actual state values by a number of devices which have a state value that falls within each bin range and hence generates a histogram 8 (FIG. 2). For example the devices such as the TCL's 7a to d can be binned according to a state of charge ($SoC_k^i$) as shown in FIG. 2. The bin values can be represented in vector form such as $b_k$ containing b bins with support points $b_s$. Preferably the bins are equidistant bins. To obtain $b_k$, Algorithm 1 can be used—see FIG. 5.

In a further step, binning vectors of subsequent time steps are concatenated, resulting in $x_k^b \in \mathbb{R}^{b \times N}$:

$$x_k^b = (b_{k-N+1}, \ldots, b_k) \quad (15)$$

Thus a preliminary final aggregated state vector is:

$$x_k = (x_{t,k}, T_k^i, \ldots T_k^{|p|}, T_{o,k}, S_k) \quad (16)$$

To facilitate the later third step, i.e. the dispatch or delivery step 6, an availability function is defined for every device such as a TCL 7a to d. The control action 5 found in the second step 4 as shown in FIG. 2 or derived from the output 18 in FIG. 1 or 4 can be fully met by the system in an ideal situation. However, this requires that all power requested can be supplied. In practical situations this is not always the case and hence it is necessary to allow an availability function for the deliverable product, e.g. power which takes into account the actual ability to supply a requested amount of the product, e.g. power. Hence, the availability function of a device relates to how easily can a device, such as a TCL, obtain the deliverable product, e.g. power such as electrical power from the market. This availability function can be expressed as the deliverable product, e.g. power such as electric power, consumed versus a heuristic ($p_r$), e.g. in accordance with the following expression for each device such as TCL i:

$$b_i(p_r) = P_i(1 - H(p_r + SoC_i - 1)); \quad (17)$$

where H corresponds to the Heaviside function and $P_i$ corresponds to the deliverable product, e.g. power consumed by each device such as a TCL when switched on.

Step 2: In the second step 4, as part of a batch reinforcement learning for example, a control action 5 for an entire cluster is determined using a control policy. As an example in this embodiment, FQI (Fitted Q-Iteration) is used to obtain an approximation $\hat{Q}^*$ of the state-action value function $Q^*$ from a batch of a number of tuples such as four tuples $\mathcal{F}$:

$$\mathcal{F} = \{(x_l, u_l, r_l, x_l^i) l = 1, \ldots, \#\mathcal{F}\} \quad (18)$$

From the resulting $\hat{Q}^*(x, u)$ a control action $u_k$ can be obtained following:

$$u_k \in \arg\min_u \hat{Q}^*(x_k, u) \quad (19)$$

In this embodiment the reward function is assumed to be known a priori and the resulting actions of the backup controller can be measured. Algorithm 2 (see FIG. 6) uses tuples of the form ($x_l, u_l, x_l', u_l^{phys}$). Algorithm 2 shows how FQI can be used in a demand response application when at least a forecast of the exogenous data is available. It is preferred if the exogenous data used in methods of the present invention is measured rather than only simulated. In Algorithm 2, $\hat{x}_l'$ denotes a successor state to $x_l$. In Algorithm 2, the observed exogenous information in $x_{ex,l}'$ is replaced by its forecasted value $\hat{x}_{ex,l}'$ (line 5 in Algorithm 2). As such, $\hat{Q}^*$ becomes biased towards the provided forecast.

To perform a regression step the following algorithm is used. During each control step, the control action $u_k$ is selected with a probability defined by:

$$P(u_k | x_k) = \frac{e^{\hat{Q}^*(x_k, u_k)/\tau D}}{\sum_{\bar{u}} e^{\hat{Q}^*(x_k, \bar{u})/\tau D}} \quad (20)$$

The temperature $\tau D$ is decreased on a daily basis according to a harmonic sequence, a high temperature results in more exploration whilst $\tau D \to 0$ results in a greedy approach.

For providing a Regression Algorithm, FQI can be used in this embodiment with a parameterization of the Q-function given by a convolutional network architecture 20 as shown in FIG. 1 and FIG. 4 comprising a convolutional neural network component 14 and a fully connected neural network, preferably a multi-layer neural network 15. The network architecture 20 takes as input a state action pair (x, u) in the form of 2D grids 12 and returns an approximated Q-value $\hat{Q}^*(x, u)$. The inputs are split into 2 parts: firstly one b×N grid 12 (FIG. 1) or one or more b×N grids 12a to d (FIG. 4) which include the binned representation previously described and, secondly, exogenous state information $x_{ex}$ including the action u. The exogenous state information $x_{ex}$ including the action u is an input 16 to a second fully connected network 17 whose output is passed to the fully connected neural network 15. The binned state representation $x^b$ is processed using the convolutional neural network 14. The convolutional neural network 14 process inputs 12 structured as one or more 2-dimensional grids by convolving each input grid 12 with multiple learnt linear filters. In this way the convolutional neural network 14 can be trained to learn to detect spatiotemporal features in the local structure of the input grid(s) 12. A convolutional layer consists of multiple filters $W^k$, each giving rise to an output feature map. The feature map $h^k$ corresponding to the $k^{th}$ filter weight matrix $W^k$ can be obtained by:

$$h_{ij}^k = \sigma(W^k * x)_{ij} + b^k \quad (21)$$

Where * represents a 2D convolution operation, x are the layer inputs, $b^k$ is a bias term and σ (sigma) is a nonlinear activation function. Multiple layers can be stacked to obtain a deep architecture. Convolutional layers can be alternated optionally with pooling layers that down sample their inputs to introduce an amount of translation invariance into the network. The convolutional neural network 14 processes the binned $x_k^b \in \mathbb{R}^{b \times N}$ in the form of 2D grids having one dimension of an input grid 12 corresponding to the b bins and the other dimension representing observations at N previous time steps. Time and state dimensions are treated equally and 2D convolution operations are applied over both dimensions. This differs from previous applications of convolutional neural networks in which the input grids are 2D images without any time dimension within the 2D grid. The introduction of 2D grids with one axis being the time dimension quantized in a series of time steps results in the ability to identify spatiotemporal features that identify local structure in the state information and its history. This enables the network 20 to identify features corresponding to events that occur over multiple time steps. These features extracted in the convolutional neural network 14 are then used as input by higher network layers in a fully connected neural network 15. The additional exogenous input values $x_{ex,k}$ and control actions $u_k$ are fed as inputs 16 into a separate fully-connected feedforward architecture 17. The multi-layer perceptron 17 first maps the inputs to an intermediate representation. This hidden representation is then combined with the output of the convolutional neural network 14 and the outputs of both networks 14, 17 are merged into fully connected layers 15. A final linear output layer 19 maps the combined hidden features to the predicted Q-value 18 of the input state-action pair.

Step 3: step 3 includes real time control whereby the control action resulting from the policy h described above, is to be converted into a product to be dispatched such as energy to be dispatched to the different devices 7a to d such as TCLs. The control actions $u_k$ can be dispatched, for example over the different devices 7a to d such as TCLs using a market-based multi-agent system. As described above the energy supply to a TCL is represented by an availability function $b_i$. After a clearing process, a clearing priority $p^*_r$, k is sent back, for instance to the different devices 7a to d in the cluster being monitored such as TCLs:

$$p^*_{r,k} = \underset{p_r}{\mathrm{argmin}} \left| \sum_{i=1}^{|\mathcal{D}|} b_i(p_r) - u_k \right| \quad (22)$$

The devices consume power according to $b_i$ ($p^*_r$, k).

For example, referring to FIG. 2 the relationship 9a to d between the product to be delivered, e.g. electrical power and each observed cluster state input parameter value that is to be aggregated, e.g. State of Charge, is determined. As indicated in FIG. 2 these relationships can be aggregated, e.g. summed to create a cluster relationship 3. In this relationship when the cluster state value is close to zero, i.e. the SoC is very low, the product to be delivered, e.g. electrical power to be consumed is a maximum. When the cluster state value is close maximum, i.e. the SoC is very high, the product to be delivered, e.g. electrical power to be consumed is a minimum as the cluster should be able to meet demand over the next time step from its own stored charge. In step 6 the relationship 3 is shown as 34. The optimised value that has been determined in step 4 is a power 32 to be delivered to the cluster in the next time period. From relationship 34 this power value 32 is read off as a desired SoC value 36 for the cluster if it is to meet the demands of the next time step. The relationships 9a to d are taken over as relationships 39a to d and the cluster value of SoC 36 is used as an input to the relationships 39 a to d, to see which of these devices must be charged (i.e. receive the product to be distributed) to bring them up to the SoC level 36 for cluster. These deliverable products, e.g. power values 38a to d, are then delivered to the TCL's 7a to d.

Example

As a specific example of a deep regression architecture, a binned cluster state $x^b$ is represented by a 28×28, 2D grid describing the binning of cluster members over the last 28 time steps. This input is processed using two 2D convolutional layers of a convolutional neural network 14. The first layer of the convolutional neural network 14 consists of four 7×7 filters, while the second layer uses eight 5×5 filters. The convolutional layers of the convolutional neural network 14 are followed by a single fully connected layer of the fully connected neural network 15 mapping the feature maps to 32 hidden nodes. Each layer was followed by a rectified linear (ReLU) activation layer. No pooling layers were used. The exogenous data 16 comprising $x_{ex,k}$ and action $u_k$ are processed using a single, fully connected hidden layer of units in a fully connected neural network 17. The combined output of the convolutional neural network 14 and feedforward network 17 are processed using two fully connected layers, each consisting of 24 units of a fully connected neural network 15. All layers used ReLU activations. The final hidden representation is mapped to a single output 18 using a fully connected, linear output layer 19 as shown in FIGS. 1 and 4. The network architecture 20 was trained as a unit using the rmsprop algorithm. In accordance with the present invention it is preferred if the network architecture 20 as a whole is trained at the same time.

In this embodiment the environment is simulated by a model. For example, this is a model of the thermal properties of buildings in which the TCL's are housed 7a to d. This is done because no measured data was available for this embodiment. In operation this simulated data would preferably be not used but rather actual measurements would be used. Hence, just for this explanation of the invention, a second-order model can be used to describe the dynamics of each building as illustrated (7a to d) in FIG. 2:

$$\dot{T}^i_a = \frac{1}{C^i_a}(T_o - T^i_a) + \frac{1}{C^i_b}(T^i_m - T^i_a) + P^i + q^i \quad (23)$$

$$\dot{T}^i_m = \frac{1}{C^i_b}(T^i_a - T^i_m) \quad (24)$$

Figure 3A:
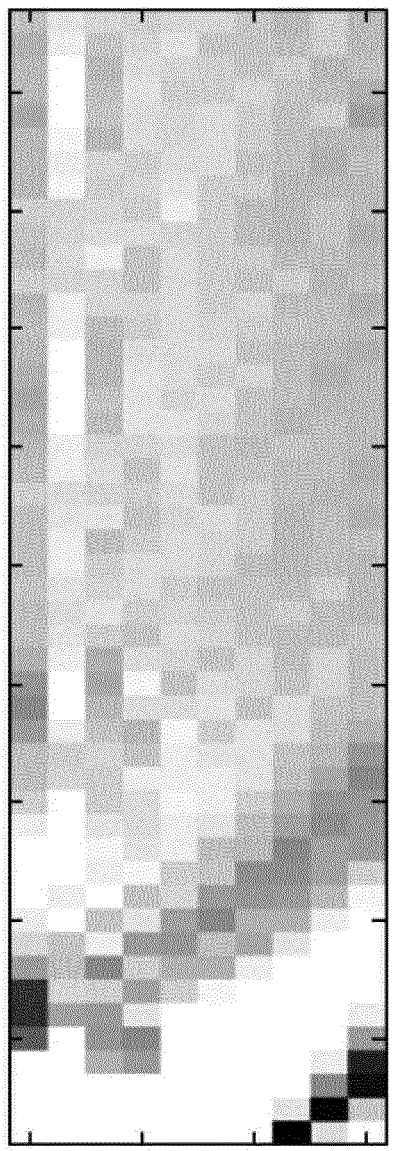
FIG. 3a is an evolution of the distribution of a TCL population over time when applying a neural network architecture according to an embodiment of the present invention.
Figure 3B:
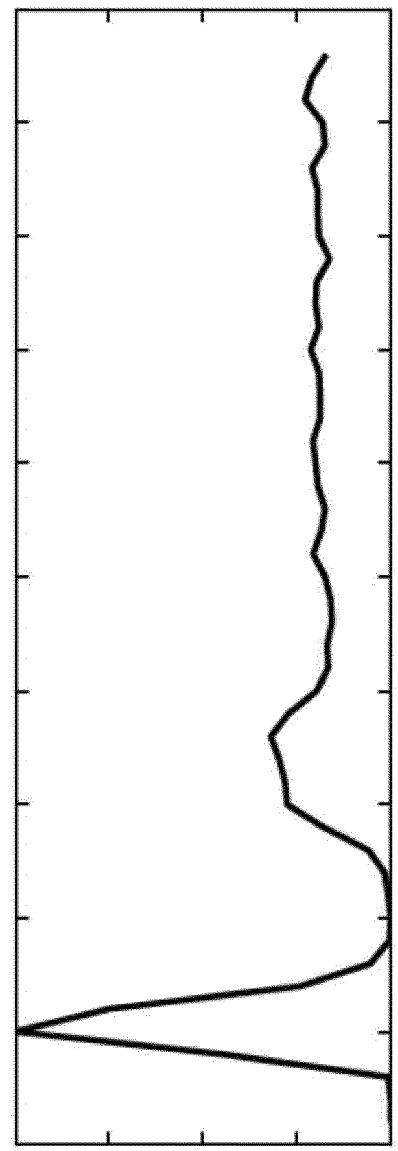

Here $T_a^i$ and $T_m^i$ are modelled operational air temperature $T_a^i$ and a virtual temperature $T_m^i$ that is attributed to a bulk mass [13]. Typically the thermal mass of the air CA is significantly smaller than that of the bulk mass $C_m^i$, whereby q is attributed to thermal heating. For each TCL 7a to d in the simulation, the values $C_a^i$ and $C_m^i$ are selected randomly from a normal distribution with mean x and standard deviation y. Also d is sampled from a normal distribution z for each time step. The power $P_i$ is set equal, for example, for all TCLs 7a to d to a value, e.g. 1.5 kW (CoP=3). The minimal and maximal temperatures are set, for example, at 20 and 21 deg C. for each TCL 7a to d merely as an example. In FIG. 3 the temperature dynamics of a cluster of 1000 TCLs is depicted where a set-back controller is used. One can observe that typical time constants are of the order of 3-4 hours. The top graph FIG. 3A shows the evolution of the temperature distribution. Initially all TCLs have the same state, however after one day de-phasing has already occurred which is a direct measure for the heterogeneity of the cluster. The lower graph in FIG. 3b shows the aggregated power as a function of time. Initially all TCLs are in phase resulting in strongly correlated consumption. After about 1 day all coherence is gone. As explained above, only $T_i^a$ is assumed available in the measurement whilst features representing $T_i^b$ are inferred from past measurements of $T_i^a$ by the convolutional procedure in the regression algorithm.

Figure 7:
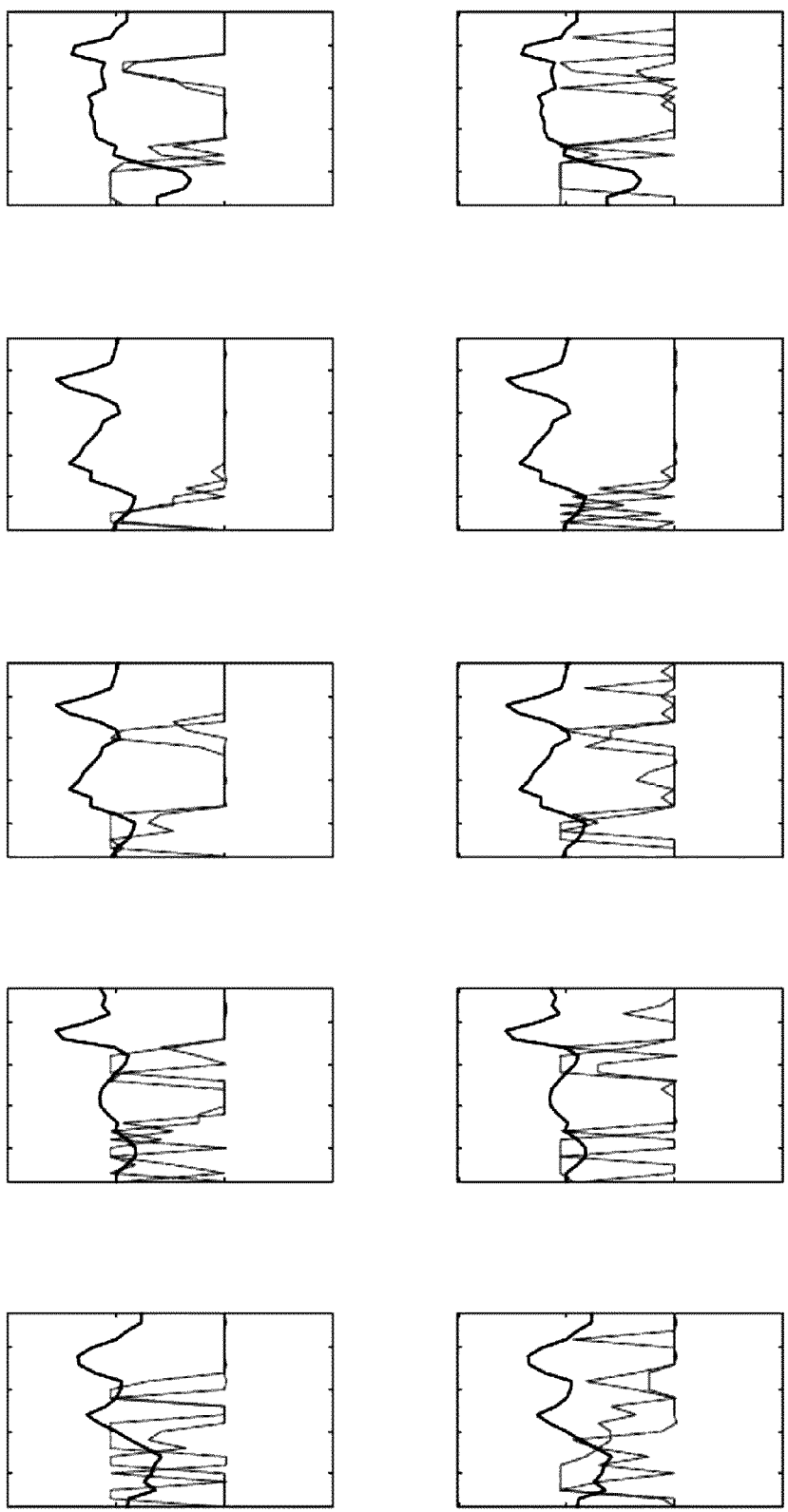
FIG. 7 is an illustration of a learning process for use with embodiments of the present invention. In the top row are control actions derived from state-time features calculated by a policy taking into account hidden features for several selected days. The middle row is the same except that there are only state features and not state-time features. The lower graph depicts the outside temperature (exogenous data).
Figure 8:
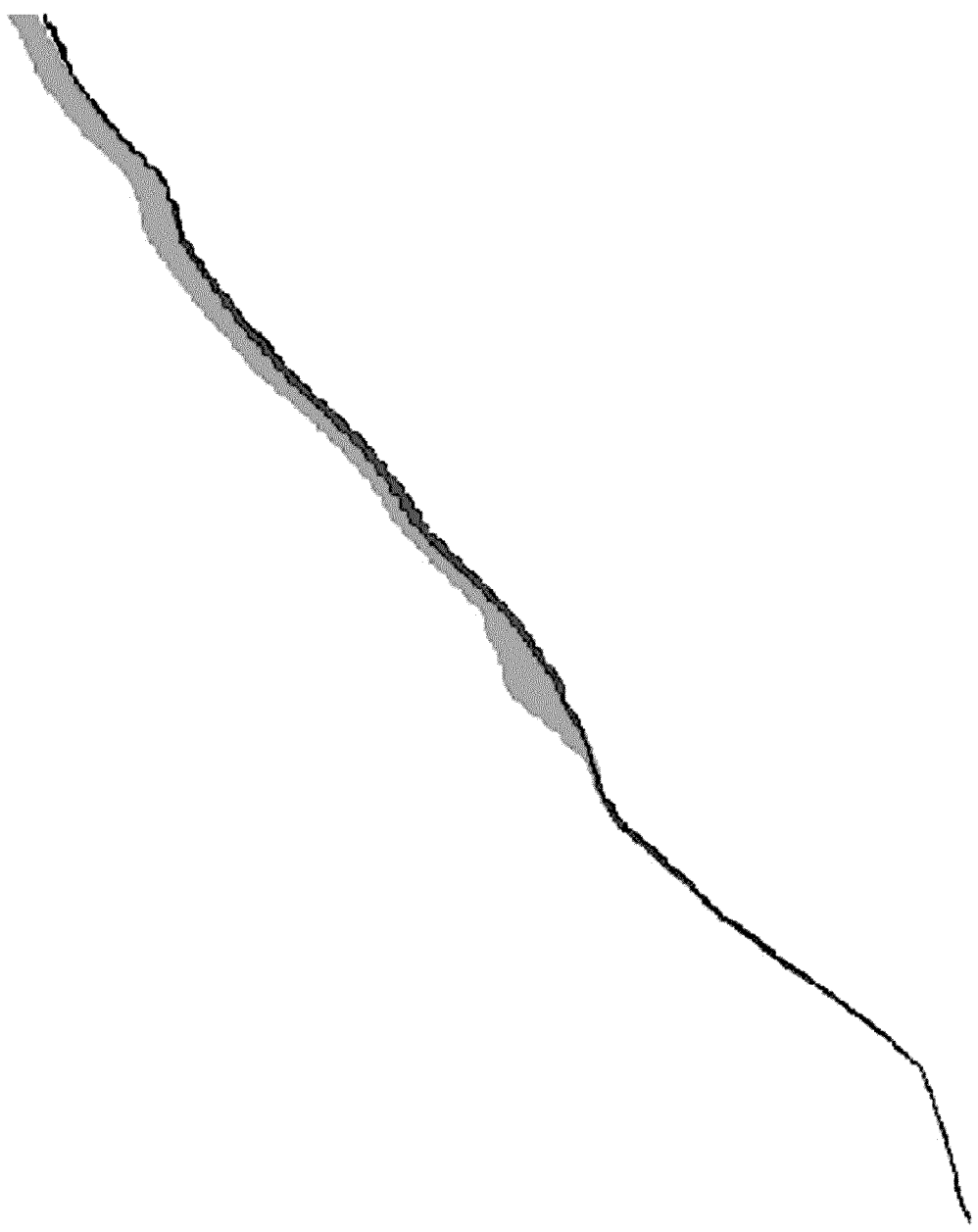
FIG. 8 shows cumulate cost with and without the inclusion of historic information when applying a neural network architecture according to an embodiment of the present invention. The graph indicates upper and lower values calculated over several runs

FIG. 7 shows a selection of the results of the policy after different number of days, indicated in the titles of the top row, i.e. after 21, 41, 61, 67 and 71 days. This is illustrated as including the state-time features in the top row and while considering only state features in the middle row. The bottom row depicts the assumed outside temperatures. One can see that after 40 days one gets meaningful policies that are smoother when taking into account state-time features. For day 61 and 67 the price signals have been the same, but the outside temperatures were not, seeing that indeed the algorithm has learned to take these forecasts into account. A more quantitative comparison between with and without time features can be seen in FIG. 8 where the upper and lower accumulated values of costs for several simulation runs are presented taking into account state-time features 24 and without taking them into account 25. The difference is in the order of 5%.

Figure 9:
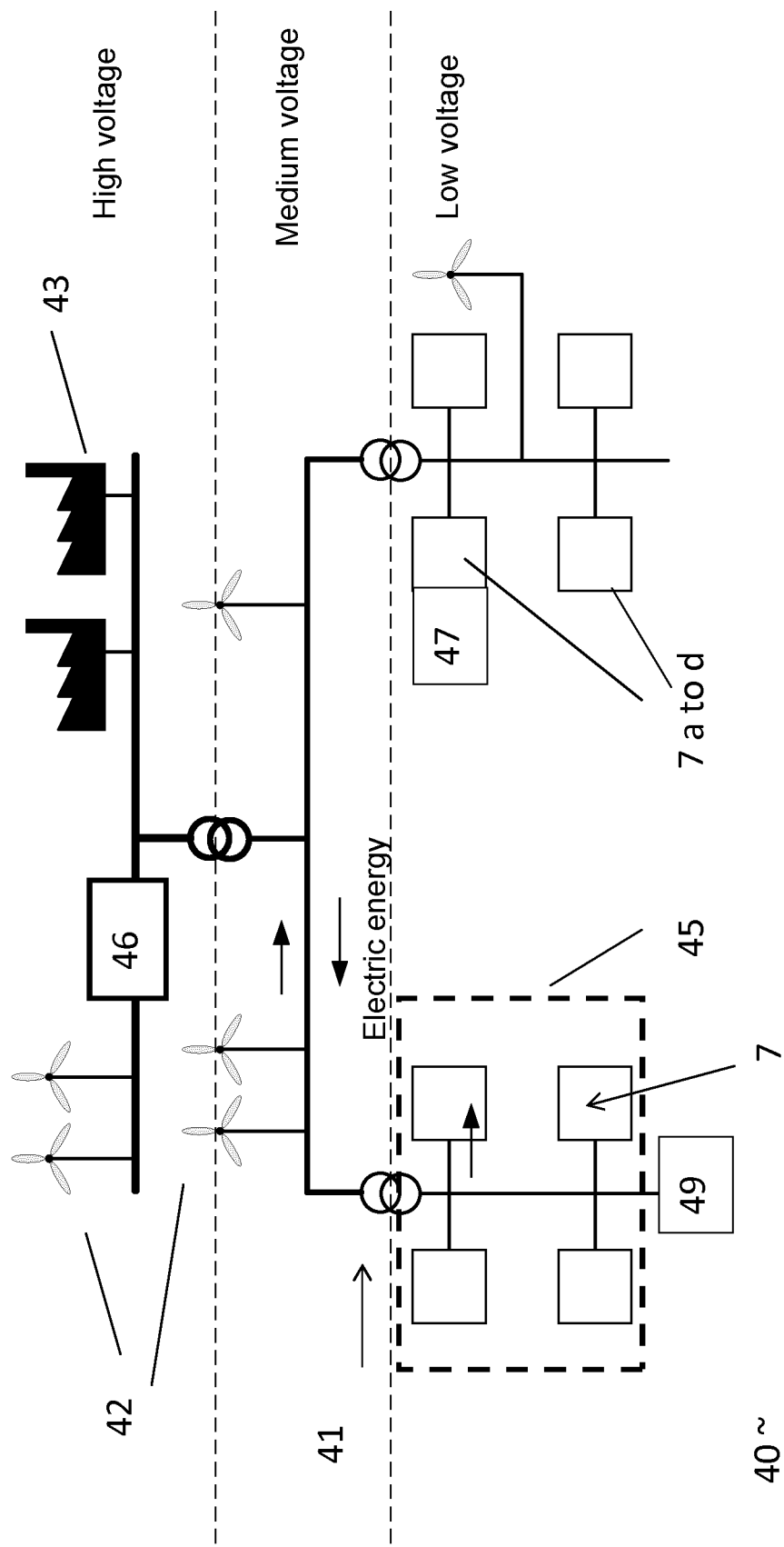
FIG. 9 illustrates a supply network according to an embodiment of the present invention.

Embodiments of the present invention described above can be applied to a power system 40 shown schematically in FIG. 9 where there are different producers 42, 43 and consumer devices 7 (see FIG. 2, devices 7a to 7d) or clusters 45 of consumer devices 7 which generate or consume electric energy and which are coupled through an electricity supply network 41. This electricity supply network 41 allows for generation and transmission of electric energy between consumer devices 7, and clusters of devices 45 and producers 42, 43 and can include a central controller 46 for controlling operation of the electricity supply network 41. There can also be local controllers 47 which control a consumer device 7 or a portion of the consumer devices 7 in a cluster 45.

Ideally at all times during operation of such a power system 40 there needs to be a balance between production and consumption. Currently the main control paradigm is that production follows consumption. This is no longer efficient for mainly two reasons, with a continued integration of renewable energy, these balancing requirements become more demanding in terms of energy, power and ramp rate or at least ramp up/down. Handling this is inefficient as is requires ramping (up/down) of mainly gas fired power plants which have unfavorable energy efficiency (primary energy to practical energy). This results in excessive energy consumption and pollution. A second important point is that the balancing assets are mainly connected to the high voltage network, whilst renewable energy generators 43 are often located at the low and medium voltage level causing local voltage and congestion issues, and which requires local flexibility to solve these. For both issues, operating according to the electric consumption instead of production can provide part of the solution as demand flexibility is abundant and efficient in terms of energy and pollution, furthermore it is connected to both high and low voltage levels. Embodiments of the present invention can be used in the control or operation of the consumption of energy such as electricity of large heterogeneous clusters of consuming devices which exhibit some flexibility, i.e. having the freedom to adjust the usage of energy over time.

Figure 10:
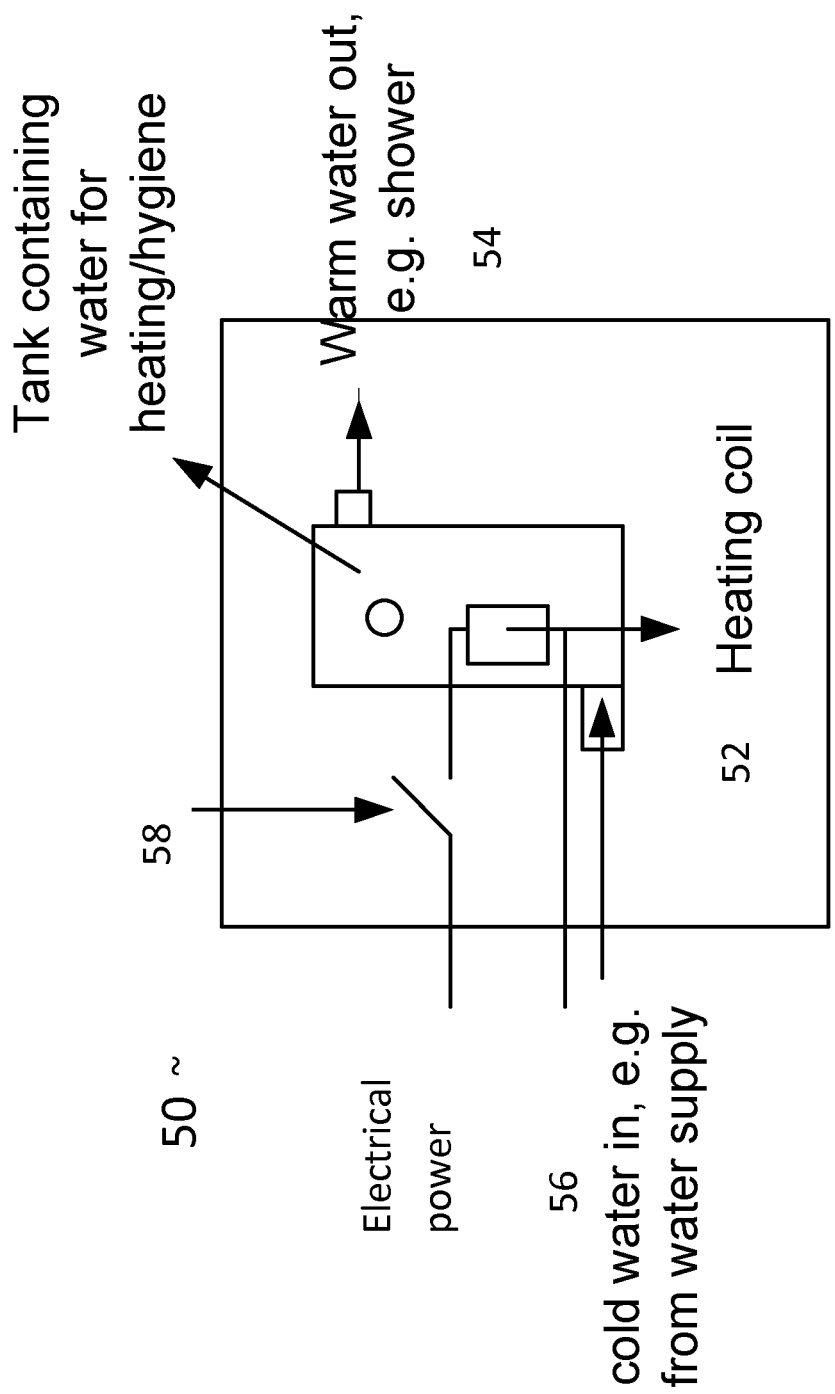
FIGS. 10 to 13 show consumer devices for use with any of the embodiments of the present invention.

An example of a consuming device 7 is thermal storage, i.e. an electric power to heat, storage tank 50 shown schematically in FIG. 10. The storage tank 50 can be a boiler or thermal buffer in accordance with WO 2012164102 which is incorporated herein by reference. A hot water storage tank 50 can convert electrical energy to thermal energy, e.g. using an immersed electric heater 52. The hot water produced can be used for e.g. showering or general domestic use. Generally, there are certain hours, e.g. during the night when no hot water is used and hence there is some flexibility as to consumption of electricity during the night as there is some flexibility in the choice of the time at which the hot water storage tank is heated and hence consumes electricity. All that is necessary is that there is adequate hot water available for the next shower. Typically, heating the boiler is set using a simple timer switch to operate during the night so that there is presently no use made of flexibility in the time during the night when the boiler is heated.

Hot water can be extracted from the top 54 and cold water is injected at the bottom 56. An electric heater 52 is present in the water volume to heat the water. Other methods of heating the water are included within the scope of the present invention. From an operational perspective a controllable relay 58 can be provided that closes or opens the electric circuit in which the heater is located. This opening or closing can be done, for example using a digital control system. For example the relay 58 can include a communication port and a microprocessor or microcontroller that can receive digital signals for switching the relay 58 on and off. For example, by sending a 0 or 1 signal to the relay e.g. from the central controller 46 or the local controller 47, the relay closes or opens accordingly. Furthermore, information concerning parameters of the hot water tank can be communicated automatically to the central controller 46 or to a local controller 47, e.g. the temperature of the water measured at one location communicated at regular time intervals. The temperature of the water is related to and can be converted into a state of charge (SoC) i.e. relative to the maximum temperature and hence the maximum energy that the device 50 may store. Water temperature and SoC are energy state values for the boiler and can be expressed in many different ways, e.g. water temperature(s), average water temperature, median water temperature, 1-SoC (this is a measure of how much energy can be supplied to the boiler before the maximum water temperature is reached) as a scaled measure, 1/SoC, 1/1-SoC, i.e. a function of SoC, etc. Any of these values can also be derived by local intelligence that uses historical records that it has stored to calculate the relevant value.

The heat storage tank 50 as shown in FIG. 10 sends relevant data to the local controller 47 or the central controller 46 for preparation of data to be introduced into the 2D grids 12 of FIG. 1 or FIG. 4. A state value should be sent at regular time intervals. The temperature of the water in the heat storage device 50 or a SoC value is representative of the amount of heat energy in the device and is accordingly a state value for this device.

Other state values that could be used are SoC, 1-SoC, 1/SoC, 1/1-SoC, a function of SoC etc. This state value can be aggregated with values from other such devices 50 or from heterogeneous devices in a cluster of such devices and then binned within a range for a bin of the histogram 8 of FIG. 2 see for example S. Koch, J. L. Mathieu, and D. S. Callaway, "Modeling and control of aggregated heterogeneous thermostatically controlled loads for ancillary services," in Proc. 17th IEEE Power Sys. Comput. Conf. (PSCC), Stockholm, Sweden, August 2011, pp. 1-7.). The binned values form the Y axis of the 2D grids 12 mentioned above. The horizontal axis of the 2D grids 12 is time, so the state value, e.g. water temperature or SoC, 1-SoC etc. is communicated to the local 47 or central controller 46 at regular time intervals.

As shown in FIG. 4 more than one sequence of 2D grids can be input into the convolutional neural network 14, 15 19. The state values for the parallel 2D grids 12 can be selected, e.g. from water temperature, average water temperature, median water temperature, SoC, 1-SoC, 1/SoC, 1/1-SoC, function of SoC etc.

Referring to FIG. 2 for example the relationship 3 can be electrical power or energy in function of 1-Soc. The closer 1-SoC is to the value 1, the more the boiler is depleted and hence the higher is the necessity for the boiler to receive electrical energy urgently. Thus the necessity to receive energy is a priority is related to the value of 1-SoC of a device. Thus priorities of devices of a cluster at any time instant can be aggregated in step 2. Thus the relationship 3 can indicate the priority (X axis) and power or energy to be supplied (Y axis) at that priority. To maintain stability it is preferred if the relationship between priority and energy or power that can be supplied allows low amounts of energy or power at high priorities and high amounts of energy only at low priorities. Hence the energy or power that can be consumed by any device is preferably a decreasing, e.g. a step-wise decreasing function of priority.

With respect to FIG. 2 the second step 4 in the three step procedure delivers a control action $u_k$ to the cluster. This control action "$u_k$" should be designed to allow the determination of an average power or an energy that the complete cluster of devices 50 will consume in the next time frame, and hence will guide which of the devices 50 of the cluster must be charged. Aggregation involves loss of information and inaccuracy in the representation as explained in US2009/228324 where it is explained that this results in suboptimal allocation of energy. US2009/228324 suggests provision of a tunable parameter for adjusting the desired accuracy based on the available communication and processing bandwidth in the control network and the desired accuracy of energy distribution. The dispatch step 6 of the present invention avoids any such problems because it can make use of low bandwidth communications as only the value of "$u_k$" has to be transmitted to the cluster. This value "$u_k$" can be related to a cleared priority using the relationship 3 which is shown in step 6 as relationship 34. Any devices that have a priority higher than the cleared priority that is obtained from relationship 34 when the value "$u_k$" is used as input can consume electrical energy in the next time frame. Instead of a cleared priority, a cleared value of a state value such as a cleared 1-SoC value can also be used. In that case devices with a 1-SoC value that is higher than the value of the cleared 1-SoC obtained from relationship 34 when the value "$u_k$" is used as an input, can consume electricity in the next time frame. Generally, a device consumes power according to the availability function $b_i$ ($p^*_r$, k) as explained with respect to equation 22 above. Other devices than on/off device can be used in embodiments of the present invention.

Summarizing these dispatch methods, step 4 provides a value "$u_k$" from which of energy or power that the cluster of devices 50 can consume can be determined. This value of "$u_k$" is preferably converted into a value related to a current necessity for electrical power or energy to be consumed by the cluster, i.e. is related to a priority. Each device in the cluster is then enabled to consume electricity for all applications where the necessity for consuming power is higher than the current necessity. The value $u_k$, is the power to be consumed by the entire cluster, and can be sent to any suitable auction mechanism such as an energy auction, in order to obtain access to the relevant energy or power. Depending upon the market situation at that moment so much power or energy will be available for the next time frame. This amount of energy may be less than specified by $u_k$ i.e. the practically and economically justified amount of energy may be less than $u_k$. However independent of which value of energy is actually obtained, the acquired amount can be used to determine the cleared priority from which it can be calculated for each device the power or energy to be consumed. This calculation can be done in the cloud or locally. Embodiments of the present invention do not exclude that the control action can be overruled locally e.g. the storage tank may be heated or cooled by manual override. Over time the convolutional neural network can learn and adapt its operation to meet such interruptions in planned operation.

In the following further examples are described, each one being able to be controlled as indicated above.

Figure 11:
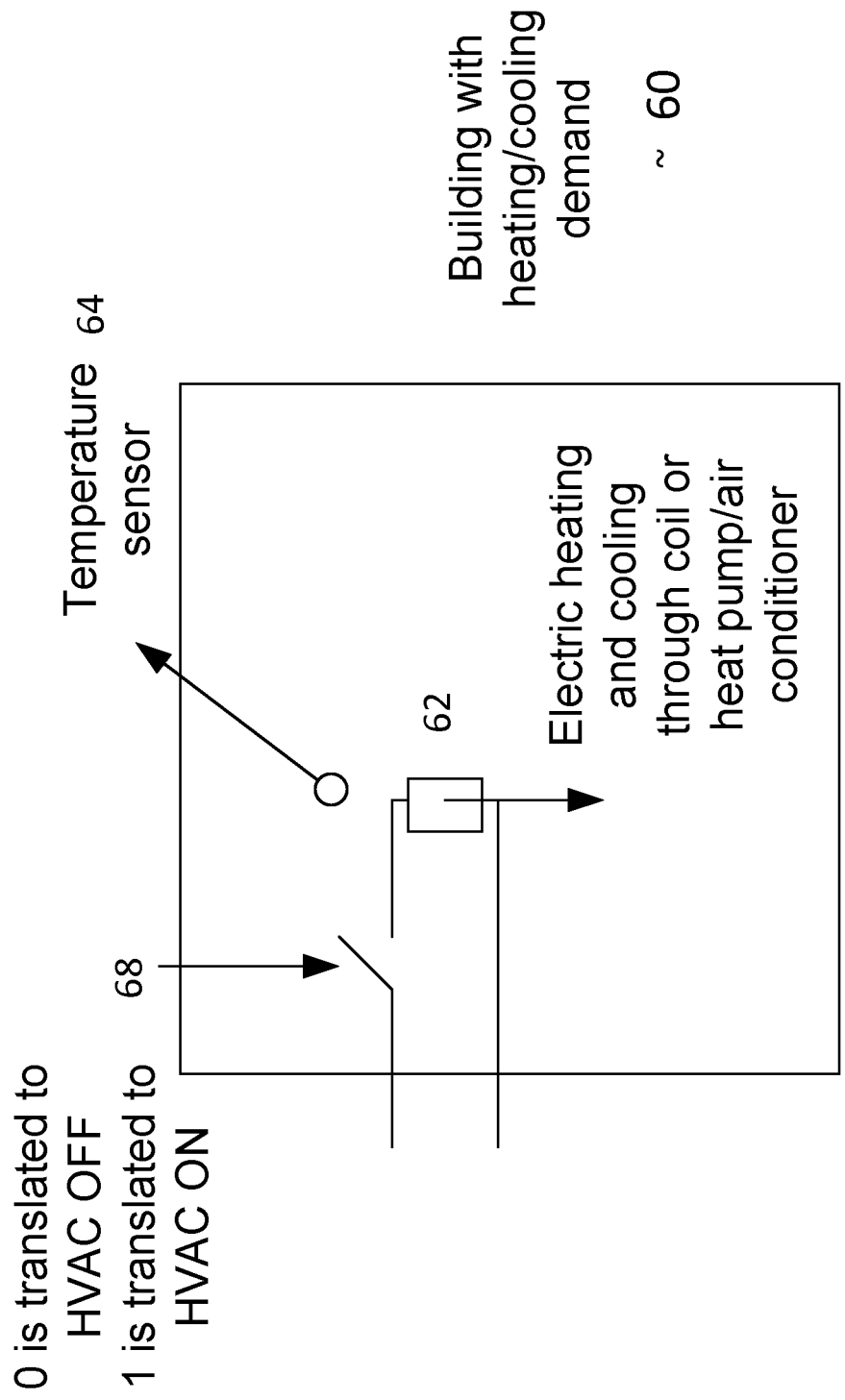

Another example of a consumer device 7 comprising thermal storage, is the heating of a room or a collection of rooms 60 as shown in FIG. 11. The heat storage comes directly from the thermal mass of the building, i.e. the air itself, walls, furniture and/or heat storage devices. The thermal energy resulting from a heater which can be an electric heater 62 is released into the air of the room or collection of rooms 60. This can be directly from an electric heater 62 or through a radiator circuit containing a medium such as water. A controllable relay 68 can be adapted to switch the heating on and off. This on and off switching can be done, for example using a digital control system. For example the relay 68 can include a communication port and a microprocessor or microcontroller that can receive digital signals for switching the relay 68 on and off. For example, by sending a 0 or 1 signal to the relay, the relay 68 closes or opens accordingly. Furthermore information concerning parameters of the rooms 60 can be communicated to the controller 46 or to a local controller 47, e.g. the air temperature measured at one location by a sensor 64. The temperature of the furniture or the walls or the air, or combinations of such values can be converted into a state of charge (SoC) i.e. relative to the maximum temperature and hence the maximum energy that the room or collection of rooms 60 may have, typically however only the operational air temperatures is available, the temperatures of furniture/walls etc. are unobserved, this exactly which needs to be inferred from the historical data in the state.

The heat storage device 60 as shown in FIG. 11 sends relevant data to the local controller 47 or the central controller 46 for preparation of data to be introduced into the 2D grids 12 of FIG. 1 or FIG. 4. The temperature of the air in the heat storage device 60 or a SoC value is representative of the amount of heat energy in the room or collection of rooms and is accordingly a state value for this device. This state value can be aggregated with values from other such devices 60 in a cluster of such devices and then binned within a range for a bin of the bins which form the Y axis of the 2D grids 12. The horizontal axis of the 2D grids 12 is time, so the state value of air temperature is communicated to the local 47 or central controller 46 at regular time intervals. With respect to FIG. 2 the second step 4 in the three step procedure delivers a control action "$u_k$" to the cluster. This control action $u_k$ can be a power or an energy that the cluster of rooms or collections of rooms 60 can consume in the next time frame, and hence will guide which of the room or collection of rooms 60 can consume electrical energy and can be heated and for how long in the next time frame. Embodiments of the present invention do not exclude that the control action can be overruled locally e.g. the rooms may be heated or cooled by manual override. Over time the convolutional neural network can learn and adapt its operation to meet such interruptions in planned operation.

Figure 12:
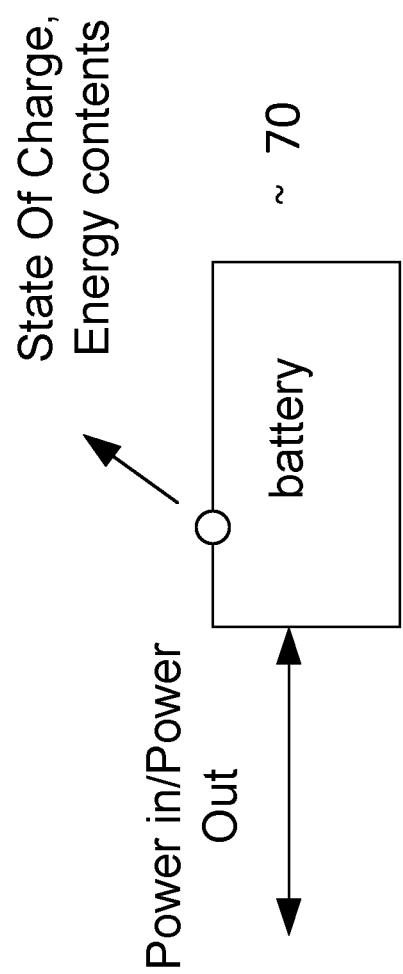

Another consumer device 7 can be an electric storage device 70, shown in FIG. 12 such as a battery or ultra-capacitors as used for example to drive a hybrid car or an electric car. The electric storage device 70 can consume/produce electric energy/power. The state value for a battery that can be sent to the central controller 46 or the local controller 47 is the State of Charge (SoC) of the battery or any other value representative of this value.

The electric storage device 70 as shown in FIG. 11 sends relevant state data to the local controller 47 or the central controller 46 for preparation of data to be introduced into the 2D grids 12 of FIG. 1 or FIG. 4. The SoC value of the electric storage device 70 is representative of the amount of heat energy in the device and is accordingly a suitable state value for this device. This state value can be aggregated with values from other such devices 70 in a cluster of such devices and then binned within a range for a bin of the bins which form the Y axis of the 2D grids 12. The horizontal axis of the 2D grids 12 is time, so the SoC state value is communicated to the local 47 or central controller 46 at regular time intervals. With respect to FIG. 2 the second step 4 in the three step procedure delivers a control action $u_k$ to the cluster. This control action $u_k$ can be a power or an energy that the cluster of devices 70 can consume in the next time frame, and hence will guide which of the devices 70 can be charged. Embodiments of the present invention do not exclude that the control action can be overruled locally e.g. the battery may be charged by manual override. Over time the convolutional neural network can learn and adapt its operation to meet such interruptions in planned operation.

Figure 13:
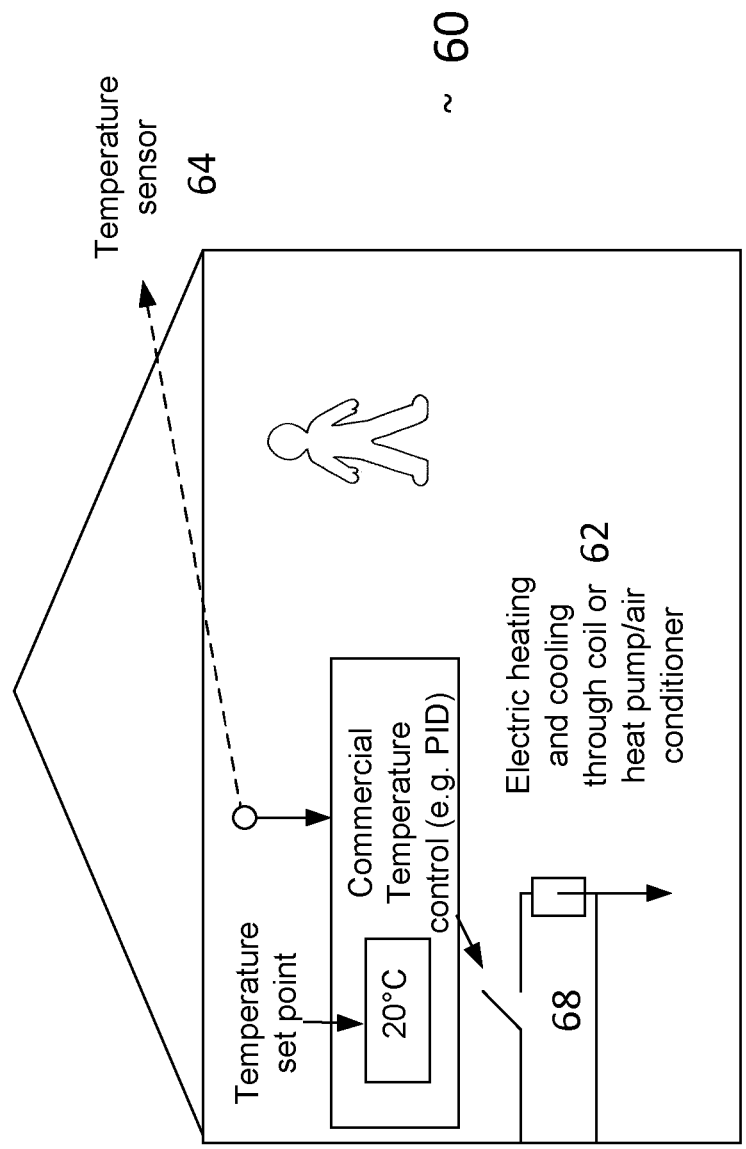

The present invention is not restricted to on-off control. Another typical implementation of power to heat storage is shown in the FIG. 13, which is very similar to the description above, however the temperature set point is controlled rather than on/off switches and this set point can preferably be changed remotely (within the constraints of a human operator), a local controller 47 than acts accordingly. For example, the local controller 47 can be a local PID controller that tracks a temperature set point, a hysteresis controller etc.

Figure 14:
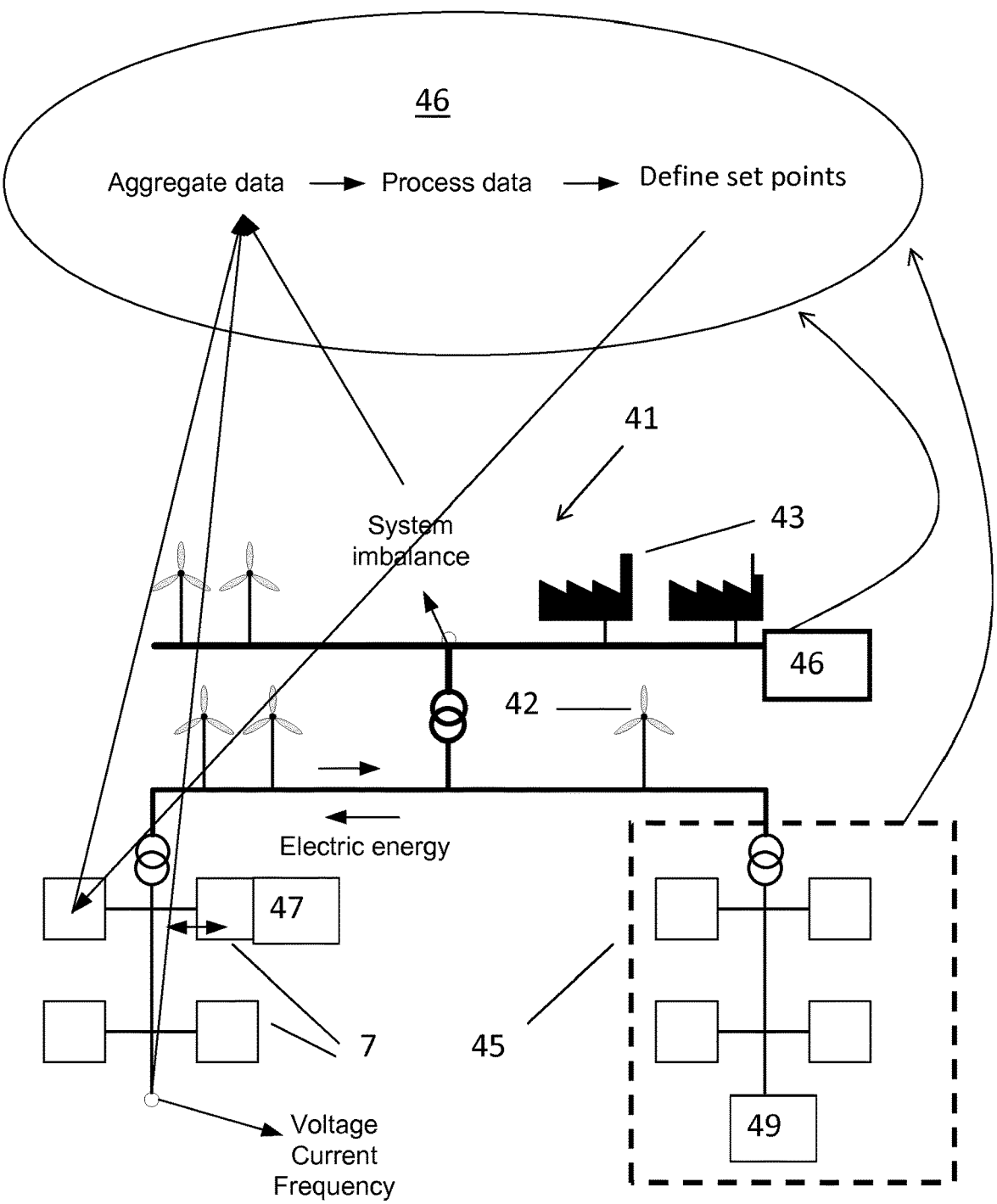
FIG. 14 illustrates operating electric demand based upon the state of the system according to an embodiment of the present invention.

In order not to interfere with the operational management of the heating system, the local controller 47 has the same available actions a human operator would have. The set point can be increased when there is local renewable energy, resulting in the local controller 47 starting to allow consumption of more energy which is stored temporarily in the air and thermal mass of the building. Thus the reaction to the control action $u_k$ in any of the embodiments can be other than on/off control but can include any change which will influence consumption of power or energy, e.g. by changing a set point of a local controller. In this embodiment the operating point (on/off status, power, temperature, . . . ) is controlled depending on the state value of the systems to be controlled (e.g. temperatures, SoC, . . . as disclosed above) and the state of the power system, e.g. balance between demand and supply, grid status expressed by e.g. voltage etc. Embodiments of the present invention are able to balance the energy generation and consumption of network 41. To keep the network operational the central controller 46 and/or the local controller 47 can be adapted to close or open all relevant relays, change switches or change set points, operate power . . . based upon the state of the power system i.e. balance, voltage, . . . ) and the state of the connected flexibility of energy sources. This is shown schematically in FIG. 14 where a system imbalance is treated as a state value for the network as a whole, e.g. the imbalance signal can be expressed as the current and expected imbalance in the network, expressed in MWh. This state value can be included as exogenous state information $x_{ex}$ as an input 16 to the second fully connected network 17 whose output is passed to the fully connected neural network 15 as shown in FIG. 2 or FIG. 4. This allows the convolutional neural network to learn and adapt to system imbalances. Alternatively, if the imbalance information would be of a high dimensional representation which could occur in the future, it can be included as one of the state values 11 (see FIGS. 1 and 4). The switch or relay of each element in the cluster of TLCs is opened or closed based upon the situation in the network and the forecasted situation in the network.

To decide if a relay is open or closed, the state of the entire cluster can be considered. The state is expressed by the measured information available, e.g. the temperatures as measured locally at each TCL. The measured temperature does not necessarily carry the total state of the system. A sequence of past observations can be used to express the state of the system. In order to keep the dimensionality of the state practical, aggregation as described above can be used. From past observations the state and a forecast of the state of the network a control policy is determined from which the control actions for each TCL is determined, i.e. it is determined if a TCL is switched on or off.

Figure 15:
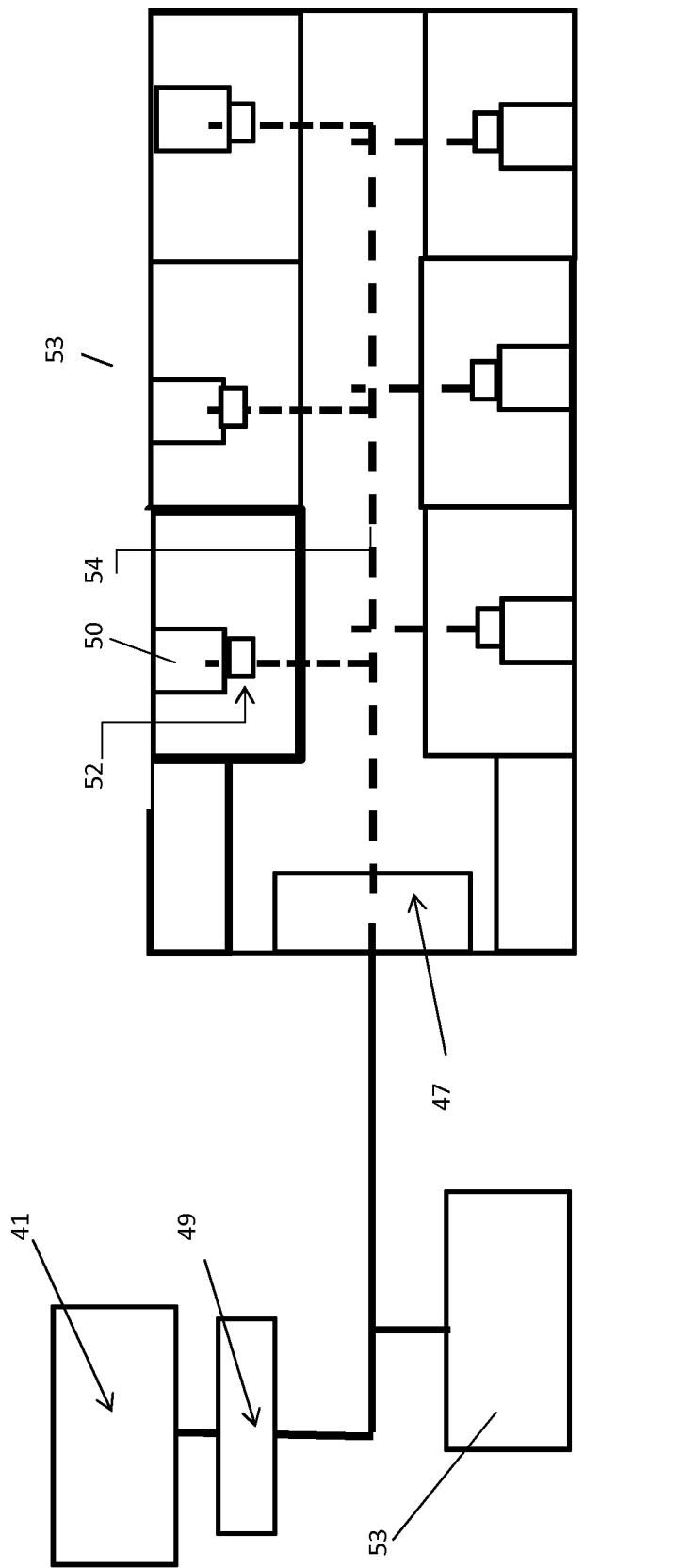
FIG. 15 illustrates how to include legacy devices according to an embodiment of the present invention.

One problem with distributed control systems is that legacy devices do not usually have means for communication with the demand response electrical distribution network 41. As shown schematically in FIG. 15 legacy devices 50, for example heterogeneous devices can be controlled by means of embodiments of the present invention.

The demand response electrical distribution network 41 provides electricity to industrial and consumer premises. For example, in a house 53 shown schematically in FIG. 15 there are rooms and in each room or in some of the rooms there is a device 50 and a controllable switch 52, e.g. a demand response adaptor as disclosed in EP-A-2 618 445 which is incorporated herein by reference. A local controller 47 with local intelligence can be installed in such a house and is linked to the demand response electrical distribution system 41 by cable for receiving power or via other telecommunication means and is linked to each controllable switch 52 and device 50 by means of at least a current carrying cable 54 (e.g. using data over power communication) and/or a LAN cable or a wireless connection. The local controller 47 is programmed (e.g. by hand) with priorities and times when each device 50 needs electricity, e.g. a boiler during the night, a tea-making machine at 07.00 every weekday morning. The local controller 47 is adapted to control each switch 52 to turn it on or off. Accordingly, the local controller 47 in combination with the controllable switch 52 emulates the legacy device towards the network 41. Communication with the demand response system 41 can be via signalling over the power cable as can be done in the house as well. For example, the local controller 47 provides the input for the 2D grids 12 of FIG. 1 or 4. For example, this input can be provided to a cluster controller 49. Input to cluster controller 49 can be a state of charge of each device 50 in the house and/or the expected demand by each device 50 over the next time period. Such data can be input into local controller 47 by the user and controller 47 provides this information to cluster controller 49. The state of charge can be determined as explained in WO2012164102 which is incorporated herein by reference. The local controller 47 can include a PID controller as disclosed in EP-A-2 608 123 which is incorporated herein by reference.

A cluster controller 49 can receive, for example, the broadcast control action $u_k$ from step 4 in FIG. 2. From this value $u_k$, controller 47 determines for example a priority for the house 53 and sends this to the local controller 47 from which priority the local controller 47 can determine directly or indirectly how much and when the devices 50 are allowed to consume electricity. By use of local intelligence in the controller 47 and/or the cluster controller 49, heterogeneous devices and in particular heterogeneous legacy devices, as typically found in many consumer premises, can be controlled by embodiments of the present invention.

FIG. 16 illustrates an overview of a network according to embodiments of the present invention. Demand response systems presently available often use direct load control, in which remotely controlled switches on consumer appliances turn off power during periods of peak electricity demand or during emergency supply conditions. These systems typically rely on one-way paging communications to get control signals to remote switches. As shown in FIG. 16 embodiments of the present invention have two-way communications between the individual devices 7 or clusters of devices 45 and the distribution network 41, e.g. including the central controller 46. Hence the network 41 has end-to-end visibility to not only have a complete picture of the infrastructure from consumer premises to the head end but also of temporal patterns extracted by the convolutional neural network.

Embodiments of the present invention relate to a method of controlling demand of a physical product to be distributed to constrained cluster elements grouped in clusters in a demand response system as well as a controller for performing the method. The present invention provides an implementation of one or more neural networks comprising a plurality of digital neurons such that each neuron is associated with an interconnection network whereby there is a weighted connection between a neuron and at least another neuron.

The physical product can be heat or electrical energy for example.

Such a method can be performed by a controller (e.g. the central controller 46, and/or the cluster controller 49 and/or the local controller 47) with processing capability such as provided by one or more microprocessors, FPGA's, or a central processing unit (CPU) and/or a Graphics Processing Unit (GPU), and which is adapted to carry out the respective functions by being programmed with software, i.e. one or more computer programmes. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such a controller may have memory (such as non-transitory computer readable medium, RAM and/or ROM), an operating system, optionally a display such as a fixed format display, data entry devices such as a keyboard, a pointer device such as a "mouse", serial or parallel ports to communicate other devices, network cards and connections to connect to any of the networks.

The software can be adapted to perform a method controlling demand of a physical product to be distributed to constrained cluster elements grouped in clusters in a demand response system when executed on a processing engine in the controller, for example. The software can be embodied in a computer program product adapted to carry out the functions itemised below when the software is loaded onto the controller and executed on one or more processing engines such as microprocessors, ASIC's, FPGA's etc. Hence controller for use with any of the embodiments of the present invention can incorporate a computer system capable of running one or more computer applications in the form of computer software.

The method and the controller can be adapted to determine the amount of the physical product to be distributed to the constrained cluster elements during a next control step using a control technique in the form of Reinforcement Learning (RL), whereby the control technique learns from interaction with the demand response system to be controlled, and extracts features by inputting to a convolutional neural network, historical observations of at least one cluster of the demand response system or derivatives of the historical observations which are preferably aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network executes 2D convolutions and learns to extract local convolutional features from combinations of local time and aggregated local state variations of the cluster elements in the 2D grid structures.

The method above can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data.

The non-volatile storage memory can be used to store persistent information that should not be lost if the computer system is powered down. The application programs may use and store information in the non-volatile memory. Other applications may be loaded into the memory and run on the computing system. The computer system may also include an interface for receiving the 2D grid data as an input to the convolutional neural network. The interface may be for receiving data from a local source, e.g. by input by a keyboard or from a peripheral memory device, e.g. from an optical disk such as a compact disc (CD-ROM or DVD-ROM), or from a magnetic tape, which is read by and written to by a suitable reader, or from solid state memory such as a flash drive or directly from sensors. The computer system can execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. Hence the 2D grid data can be obtained remotely via data transmission networks. Hence, the computer system may include a communication interface. The communication interface allows software and data to be transferred between the computer system and external devices including networks or the "cloud". Examples of communication interface may include a modem, a network interface such as an Ethernet card, a communication port, or a PCMCIA slot and card, etc. Software and data transferred via communication interface are in the form of signals which may be, for example, electronic, electromagnetic, optical, or other signals capable of being received by the communication interface. These signals are provided to communication interface via a local or remote communication channel. This communication channel carries signals and may be implemented using wire or cable, fibre optics, a phone line, a cellular phone link, an RF link, and/or other communication channels.

A non-transitory signal storage device can store computer-executable instructions that, when executed by at least one processor, perform any of the methods of the present invention. Computer program products (also called computer control logic) can be stored in main memory and/or secondary memory. Computer programs products may also be received via a communication interface. Such computer program products, when run, enable the computer system to perform the features of the present invention as discussed herein. Accordingly, such computer programs represent controllers of the computer system.

The software embodied in the computer program product is adapted to carry out the following functions when the software is loaded onto the respective device or devices and executed on one or more processing engines such as microprocessors, ASIC's, FPGA's etc.:

controlling demand of a physical product to be distributed to constrained cluster elements grouped in clusters in a demand response system, determining the amount of the physical product to be distributed to the constrained cluster elements during a next control step using a control technique in the form of Reinforcement Learning (RL), whereby the control technique learns from interaction with the demand response system to be controlled.

The software embodied in the computer program product is adapted to carry out the following functions when the software is loaded onto the respective device or devices and executed on one or more processing engines such as microprocessors, ASIC's, FPGA's etc.:

allowing input to a convolutional neural network of historical observations of at least one cluster of the demand response system or derivatives of the historical observations aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network executes 2D convolutions and learns to extract local convolutional features from combinations of local time and aggregated local state variations of the cluster elements in the 2D grid structures.

The software embodied in the computer program product is adapted to carry out the following functions when the software is loaded onto the respective device or devices and executed on one or more processing engines such as microprocessors, ASIC's, FPGA's etc.:

inputting at least extracted local convolutional features from the convolutional neural network into a first neural network, the first neural network outputting at least an approximation of a state-action value function which provides values for the at least one cluster associated with each combination of the at least one cluster being in a state and taking an action, determining or calculating a control action being a preferred combination of taking an action and a cluster being in a state, or being derived from a preferred combination of taking an action and a cluster being in a state, and distributing target amounts of the physical product to be consumed or liberated by the cluster elements during a next control step in accordance with the control action.

The computer system is provided with a suitable output interface which can be a communication interface as explained above.

The software embodied in the computer program product is adapted to carry out the following functions when the software is loaded onto the respective device or devices and executed on one or more processing engines such as microprocessors, ASIC's, FPGA's etc.:

provision of the first neural network preferably as a fully connected neural network, and/or providing the control technique as a model-free control technique.

The software embodied in the computer program product is adapted to carry out the following functions when the software is loaded onto the respective device or devices and executed on one or more processing engines such as microprocessors, ASIC's, FPGA's etc.:

implementing the state-action value function as a Q-function $(Q(x,u))$.

The software embodied in the computer program product is adapted to carry out the following functions when the software is loaded onto the respective device or devices and executed on one or more processing engines such as microprocessors, ASIC's, FPGA's etc.:

inputting the control action and exogenous state information into a second neural network which is connected as an input to the first neural network, merging exogenous state information and the control action with the extracted convolutional local features of the convolutional neural network, before merging exogenous state information and the control action with the extracted convolutional local features of the convolutional neural network, a separate feature extraction is performed, wherein the exogenous state information and the control action is first fed into the second neural network, this second neural network mapping the exogenous state information and the control action into a learnt internal representation that is combined with the extracted convolutional local features in a next hidden layer.

The software embodied in the computer program product is adapted to carry out the following functions when the software is loaded onto the respective device or devices and executed on one or more processing engines such as microprocessors, ASIC's, FPGA's etc.:

provision of the second neural network preferably as a fully connected neural network, and/or provision of the hidden layer, preferably as fully connected layer.

The software embodied in the computer program product is adapted to carry out the following functions when the software is loaded onto the respective device or devices and executed on one or more processing engines such as microprocessors, ASIC's, FPGA's etc.:

the convolutional neural network first capturing patterns in the 2D grid structures and the convolutional neural network and the first and second neural networks learning a mapping from the aggregated cluster states and exogenous data to the target amounts.

The software embodied in the computer program product is adapted to carry out the following functions when the software is loaded onto the respective device or devices and executed on one or more processing engines such as microprocessors, ASIC's, FPGA's etc.:

inputting the 2D grid structures having one dimension representing all observations of a cluster state at fixed time steps and the second dimension corresponds to changes over time of values of each of a plurality of state variables of cluster elements at all time steps, the 2D feature extraction operations being applied over time as well as space resulting in the identification of spatiotemporal features that identify local structure in the state information as well as in the history.

The software embodied in the computer program product is adapted to carry out the following functions when the software is loaded onto the respective device or devices and executed on one or more processing engines such as microprocessors, ASIC's, FPGA's etc.:

learning features that represent changes in state values that occur over multiple time steps, inputting the learnt features to higher network layers of the first and optionally the second fully connected neural networks.

The software embodied in the computer program product is adapted to carry out the following functions when the software is loaded onto the respective device or devices and executed on one or more processing engines such as microprocessors, ASIC's, FPGA's etc.:

training the convolutional network and the first and the second networks together at the same time.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A computer based method of controlling demand of a physical product to be distributed to constrained cluster elements grouped in clusters in a demand response system, the method comprising the steps of:
   determining the amount of the physical product to be distributed to the constrained cluster elements during a next control step using a control technique in the form of Reinforcement Learning (RL), whereby the control technique learns from interaction with the demand response system to be controlled, the method comprising an feature extraction step of:
      inputting to a convolutional neural network historical observations of at least one cluster of the demand response system or derivatives of the historical observations, said historical observations or said derivatives of the historical observations being aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network executes 2D convolutions and learns to extract local convolutional features from combinations of local time and aggregated local state variations of the cluster elements in the 2D grid structures,
   the method further comprising:
      inputting at least extracted local convolutional features to a first neural network, the first neural network outputting at least an approximation of a state-action value function which provides values for the at least one cluster associated with each combination of the at least one cluster being in a state and taking an action,
      determining or calculating a control action being a preferred combination of taking an action and a cluster being in a state, or being derived from a preferred combination of taking an action and a cluster being in a state, and
      distributing target amounts of the physical product to be consumed or liberated by the cluster elements during a next control step in accordance with the control action.

2. The method of claim 1 wherein the control technique is model-free.

3. The method of claim 1, wherein the state-action value function is a Q-function ($Q(x,u)$).

4. The method of claim 1, wherein the product is heat energy or electrical power or energy.

5. The method of claim 1, wherein the control action and exogenous state information is input to a second neural network which is connected as an input to the first neural network.

6. The method of claim 5, further comprising merging exogenous state information and the control action with the extracted convolutional local features of the convolutional neural network.

7. The method of claim 6, wherein before merging exogenous state information and the control action with the extracted convolutional local features of the convolutional neural network, a separate feature extraction is performed, wherein the exogenous state information and the control action is first fed into the second neural network, this second neural network mapping the exogenous state information and the control action into a learnt internal representation that is combined with the extracted convolutional local features in a next hidden layer.

8. The method of claim 5, wherein a network imbalance value is included in the exogenous state information.

9. The method of claim 5, wherein the control action determined for one time step is included in the exogenous information of a next time step.

10. The method of claim 1, further comprising emulating a legacy device.

11. The method of claim 5, wherein the convolutional neural network first captures patterns in the 2D grid structures and the convolutional neural network and the first and second neural networks learn a mapping from the aggregated cluster states and exogenous data and the control action to the target amounts.

12. The method of claim 1, wherein the 2D grid structures have one dimension representing all observations of a cluster state at fixed time steps and the second dimension corresponds to changes over time of values of each of a plurality of state variables of cluster elements at all time steps, the 2D feature extraction operations being applied over time as well as space resulting in the identification of spatiotemporal features that identify local structure in the state information as well as in the history.

13. The method of claim 12, wherein features are learnt that represent changes in state values that occur over multiple time steps.

14. The method of claim 13, wherein the features that are learnt are used as input by higher network layers of at least the first neural network.

15. The method of claim 5, wherein the convolutional network and the first and the second neural networks are trained together.

16. A computer based network architecture for controlling demand of a physical product to be distributed to constrained cluster elements grouped in clusters in a demand response system, comprising:

means for determining the amount of the physical product to be distributed to the constrained cluster elements during a next control step using a control technique in the form of Reinforcement Learning (RL), whereby the control technique learns from interaction with the demand response system to be controlled, means for extracting features comprising:

an input to a convolutional neural network adapted for inputting historical observations of at least one cluster of the demand response system or derivatives of the historical observations, said historical observations or said derivatives of the historical observations being aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network is adapted to execute 2D convolutions and learns to extract local convolutional features from combinations of local time and aggregated local state variations of the cluster elements in the 2D grid structures;

an input of at least extracted local convolutional features from the convolutional neural network into a first neural network, the first neural network being adapted to output at least an approximation of a state-action value function which provides values for the at least one cluster associated with each combination of the at least one cluster being in a state and taking an action, and means for determining or calculating a control action being a preferred combination of taking an action and a cluster being in a state, or being derived from, a preferred combination of taking an action and a cluster being in a state, and means for distributing target amounts of the physical product to be consumed or liberated by the cluster elements during a next control step in accordance with the control action.

17. The computer based network architecture of claim 16, wherein a second neural network is provided which is connected as an input to the first neural network and the second neural network is adapted for receiving the control action and exogenous state information as an input.

18. A controller for controlling demand of a physical product to be distributed to constrained cluster elements grouped in clusters in a demand response system, comprising:

means for determining the amount of the physical product to be distributed to the constrained cluster elements during a next control step using a control technique in the form of Reinforcement Learning (RL), whereby the control technique learns from interaction with the demand response system to be controlled, means for extracting features comprising:

an input to a convolutional neural network adapted for inputting historical observations of at least one cluster of the demand response system or derivatives of the historical observations, said historical observations or said derivatives of the historical observations being aggregated in one or more 2D grid structures in which one dimension of a 2D grid structure represents a plurality of time steps and the other dimension captures a cluster state at the plurality of the time steps, the cluster state being represented by aggregating local states of cluster elements in the at least one cluster for each time step, wherein the convolutional neural network is adapted to execute 2D convolutions and learns to extract local convolutional features from combinations of local time and aggregated local state variations of the cluster elements in the 2D grid structures, an input of at least extracted local convolutional features from the convolutional neural network into a first neural network, the first neural network being adapted to output at least an approximation of a state-action value function which provides values for the at least one cluster associated with each combination of the at least one cluster being in a state and taking an action, and means for determining or calculating a control action being a preferred combination of taking an action and a cluster being in a state, or being derived from, a preferred combination of taking an action and a cluster being in a state, and means for distributing target amounts of the physical product to be consumed or liberated by the cluster elements during a next control step in accordance with the control action.

19. A computer program product comprising code which when executed on a processing engine is adapted to carry out the method of claim 1.

20. The computer program product of claim 19, stored on a non-transitory machine readable signal storage means.

\* \* \* \* \*